(12) United States Patent
Yawalkar et al.

(10) Patent No.: US 11,997,118 B1
(45) Date of Patent: May 28, 2024

(54) SCRIPTING ATTACK DETECTION AND MITIGATION USING CONTENT SECURITY POLICY VIOLATION REPORTS

(71) Applicant: Intuit, Inc., Mountain View, CA (US)

(72) Inventors: Siddhesh Yawalkar, Sunnyvale, CA (US); Hemant Puri, Fremont, CA (US); Swapnil Bhalode, Fremont, CA (US); Sandeep Bhatkar, Sunnyvale, CA (US); Anant Agrawal, Indore (IN); Sangam Shankar, Mysore (IN); Gabe Gallagher, San Diego, CA (US); Erick Lee, San Jose, CA (US)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/225,671

(22) Filed: Jul. 24, 2023

(51) Int. Cl.
  *H04L 29/06* (2006.01)
  *H04L 9/40* (2022.01)

(52) U.S. Cl.
  CPC ...... *H04L 63/1416* (2013.01); *H04L 63/1466* (2013.01); *H04L 63/20* (2013.01)

(58) Field of Classification Search
  CPC .. H04L 63/1416; H04L 63/1466; H04L 63/20
  See application file for complete search history.

(56) References Cited

U.S. PATENT DOCUMENTS

| 11,349,812 B2 * | 5/2022 | Biradar | H04L 63/14 |
| 11,599,637 B1 * | 3/2023 | Seletskiy | G06F 21/564 |
| 2016/0381056 A1 * | 12/2016 | Floering | G06F 16/23 726/23 |
| 2019/0132355 A1 * | 5/2019 | Egbert | G06F 21/566 |
| 2020/0259861 A1 * | 8/2020 | Margel | H04L 63/20 |
| 2021/0099483 A1 * | 4/2021 | Shukla | G06F 21/566 |
| 2021/0400081 A1 * | 12/2021 | van der Mandele | H04L 63/1416 |
| 2022/0138288 A1 * | 5/2022 | Saberidokht | G06N 20/20 726/26 |

* cited by examiner

*Primary Examiner* — Ka Shan Choy
(74) *Attorney, Agent, or Firm* — Dinsmore & Shohl LLP

(57) ABSTRACT

Certain aspects of the present disclosure provide techniques for Scripting attack detection and mitigation. A method generally includes receiving a first report indicating a first violation for a first security policy applied to a first web application; identifying a first plurality of features associated with the first violation; classifying the first violation as a first JavaScript attack based on the first plurality of features; and taking action to mitigate the first JavaScript attack on the first web application.

20 Claims, 8 Drawing Sheets

SCRIPTING ATTACK DETECTION AND MITIGATION USING CONTENT SECURITY POLICY VIOLATION REPORTS

INTRODUCTION

Aspects of the present disclosure relate to scripting attacks, and in particular to using content security policy (CSP) violation report(s) to detect and mitigate such attacks.

BACKGROUND

A software supply chain attack, also commonly referred to as a "third-party attack," occurs when a cyber threat actor manipulates the code in third-party software components in order to compromise the "downstream" applications that use them. In particular, these attacks involve threat actors infiltrating a less secure third-party organization to exploit and access an existing trusted connection that the third-party has with a target organization (e.g., the victim). These software supply chain attacks have become a focal point for threat actors due to (1) the technical problems, such as vulnerabilities and flaws, common in software, thereby making it ripe for attack, combined with (2) the large attack "surface" made available by the connected software supply chain.

In some cases, cyber threat actors use the compromised, third-party software vendor to gain privileged and persistent access to a victim network. By compromising a third-party software vendor, cyber threat actors bypass perimeter security measures, such as border routers, firewalls, etc., and gain initial access. Once initial access is achieved, the consequences of a software supply chain attack can be severe. For example, immediate effects of an attack may include operational delays, system infiltration, and/or the theft of sensitive credentials and/or customer data, while the long-term consequences may include regulatory fines, compliance concerns, reputation damage, attacks on connected businesses, and/or lost customers, to name a few.

Scripting code for web applications (e.g., software or program which is accessible using any web browser) is a notable contributor to the ongoing software supply chain attack problems. One example scripting code includes JavaScript®, a programming language that is one of the core technologies used to build web applications and websites, alongside hypertext markup language (HTML) and cascading style sheets (CSS). JavaScript code may be used to perform dynamic tasks on web pages, such as creating content, displaying maps, animating graphics, playing music, and/or the like. Currently, over 98% of websites use JavaScript for client-side web page behavioral elements, while approximately 80% of websites use an open-source (e.g., software that is generally free to reuse, modify, and/or publish without permission) or a third-party JavaScript library as part of their web application.

JavaScript libraries are collections of pre-written JavaScript code and/or functions that can be used to build websites and/or web-based applications. In other words, a JavaScript library has codes and/or functions that developers can reuse and repurpose. A developer writes these codes, and other developers reuse the same code to perform a certain task, such as preparing a slideshow, instead of writing the code from scratch. Accordingly, re-writing of code and recognizing that certain JavaScript functions may need to be implemented multiple times led to the development of such JavaScript libraries. Popular JavaScript libraries used today include, but are not limited to, libraries used for document object model (DOM) manipulation, such as jQuery®, libraries used for data handling, such as D3.js®, and libraries used to create data visualizations in charts in maps, such as Chart.js®.

While code reuse (e.g., via scripting libraries, such as JavaScript libraries) simplifies and accelerates application development, it has the potential to cause serious technical issues, such as security problems for organization thereby leaving such organizations vulnerable to attack. Specifically, cross-site scripting, commonly referred to as "XSS," occurs when threat actors execute such malicious scripting code within a victim's web browser, thereby affecting businesses, employees, and/or customers alike. In addition, compromised scripting code may be present in open-source libraries. Because there is little to no oversight in open-source libraries, vulnerabilities and malicious scripts can often lay unnoticed for significant amounts of time.

Accordingly, what is needed are techniques for detecting and mitigating software supply chain attacks, such as XSS attacks, as well as techniques for preventing such attacks from occurring.

SUMMARY

One embodiment provides a method for scripting attack detection and mitigation. The method generally includes receiving a first report indicating a first violation for a first security policy applied to a first web application. The method generally includes identifying a first plurality of features associated with the first violation. The method generally includes classifying the first violation as a first scripting attack based on the first plurality of features. The method generally includes taking action to mitigate the first scripting attack on the first web application.

Another embodiment provides a method for scripting attack detection and mitigation. The method generally includes receiving a plurality of reports indicating a plurality of violations for one or more security policies applied to one or more web applications. The method generally includes identifying, for each of the plurality of reports, a plurality of features. The method generally includes classifying the plurality of violations as a scripting attack based on the plurality of features identified for each of the plurality of reports. The method generally includes taking action to mitigate the scripting attack on the one or more web applications.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
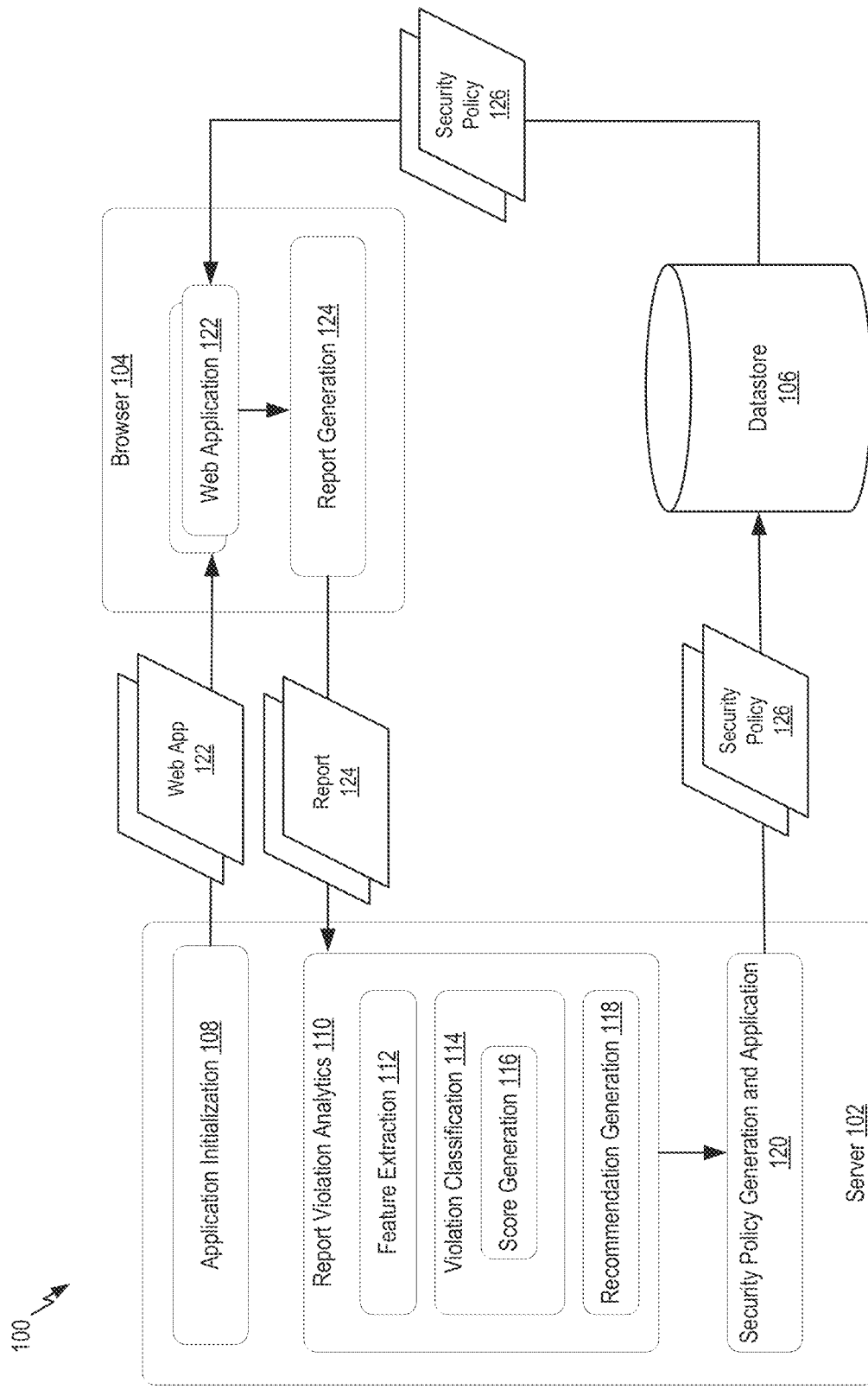
FIG. 1 illustrates an example system configured for scripting attack detection and mitigation.

Conventional approaches for mitigating and reporting XSS attacks, such as JavaScript attacks, include implementing a content security policy (CSP) mechanism. CSP is an added layer of security that makes it possible for developers to reduce, and in some cases eliminate, the vectors by which XSS attacks can occur. In particular, CSP mechanisms work by providing a framework for developers to control privilege and/or the loading of resources for an application process.

For example, CSP directives are defined in hypertext transfer protocol (HTTP) response headers, called CSP headers. The directions included in the CSP headers may instruct a browser on trusted content sources and/or include a list of sources that should be prevented. In addition, CSP headers may declare content restrictions by specifying server origins and/or script endpoints. For example, CSP directives may include fetch directives, which control the locations from which certain resource types may be loaded. A first example fetch directive, "scrip-src," is used to define locations from which external scripts can be loaded, while a second example fetch directive, "font-src," is used to specify permitted sources for loading fonts. Such directives included in CSP headers can help mitigate vulnerabilities by blocking web applications, and the browsers they are running on, from loading potentially dangerous (e.g., malicious) resources when they do not comply with the CSP directives.

If there is an attempt to load a blocked resource, a CSP header violation (referred to herein as a "CSP violation") results. A CSP violation may indicate a script, a plugin, and/or a resource that is not covered and/or permitted by an applied CSP. To obtain critical visibility into real-time CSP violations that are occurring, CSP reporting may be enabled. CSP reporting helps to provide immediate feedback into the types of violations that are occurring in real-time across a web application. Based on these reported violations, a developer may be able to determine if a policy has become outdated and/or if the policy needs to be revised to block different resources.

As an illustrative example, a web application developer may want to start using a credit card validation library written in JavaScript to validate expiration dates, security codes, and credit card numbers entered into a checkout page of a web application. When adding this functionality to the web application, the web application developer may forget to revise the CSP policy to reflect that change. Where the CSP policy explicitly identifies libraries that are able to be loaded, the CSP policy would block functionality provided by the credit card validation library, thereby preventing the web application from working as expected given the CSP has not been updated to permit use of this library. CSP reports help to detect this misconfiguration such that necessary directives in the CSP are updated to allow the new cred card validation feature to work.

Given the above example, not all reported CSP violations are indicative of a scripting attack. However, conventional CSP implementations are not effective for making this distinction. In particular, individual CSP violations are received and action is taken to fine tune one or more CSP policies applied to a web application based on the received violations, instead of analyzing these CSP violations to determine if a scripting attack is persisting. For the reasons described above, it is important to accurately detect malicious code to block existing attacks from causing further problems on a web application for which the violation was generated, and proactively prevent similar scripting attacks on other web applications utilizing this malicious code. An inability of a system to detect and mitigate scripting attacks presents a technical problem, at least with respect to the security of web applications. Accordingly, there is a need for a technical solution for detecting scripting attacks on web application(s), so that they can be blocked and bad outcomes can be avoided on these web application(s) and, in some cases, other web application(s) utilizing the same malicious scripting code.

Embodiments described herein overcome the aforementioned technical problems and improve upon the state of the art by providing a system configured to analyze one or more CSP violations to detect a scripting attack, such as a JavaScript attack, occurring in real-time. For example, the system may be configured to receive a CSP report indicating a CSP violation for a security policy applied to a CSP-protected web application and identify a plurality of features associated with the CSP violation. Features analyzed by the system may include information about an operating system (OS), a browser, and/or a domain name used to run the web application, a resource that was prevented from loading on the browser that triggered the CSP violation, scripting behavior and/or loading sequences on the web application, and/or the like. The system may analyze and/or correlate the identified plurality of features to discern whether the violation is indicative of a scripting attack.

In some embodiments, the system determines whether the CSP violation is indicative of a scripting attack using a machine learning model configured to generate a score indicative of a scripting attack. For example, the model may be configured to process features identified for a CSP violation and generate a score for the violation. Processing the identified features may involve applying different weights to each of the identified features to predict the score. In machine learning, weights are the real values that are applied to each input/feature and they convey the importance of that corresponding feature in predicting the final output (e.g. the score). The predicted score may be compared against an individual attack threshold (e.g., pre-determined/pre-configured threshold) to determine whether the CSP violation should be classified as a scripting attack or not.

In cases where the analyzed CSP violation is indicative of a scripting attack, the system may further be configured to automatically take action to mitigate the attack on the web application. Mitigating the attack may involve updating the CSP to prohibit the execution of scripting code associated with the attack, and in some cases, removing the attacking script vector altogether from the web application. Further, in some cases, mitigating the attack involves preventing further instances of the attack through appropriate scripting code changes.

In some embodiments, the system is further configured to detect a large-scale scripting attack (also referred to as a "widespread scripting attack") against multiple CSP-protected web applications. For example, the system may be configured to receive multiple CSP reports, each indicating a CSP violation that occurred for a security policy applied to a CSP-protected web application. Features associated with each of the CSP violations may be analyzed together to determine whether these CSP violations are indicative of a large-scale scripting attack. In cases where the analyzed CSP violations are determined to be associated with a scripting attack, the system is further configured to automatically take action to mitigate the attack on the web applications where the CSP violations were reported.

In some embodiments, the system is further configured to adjust CSPs for other web applications running scripting code determined to be malicious. For instance, three web applications may be using a same credit card validation library written in JavaScript. CSP violations received and analyzed for the first and second web application may indicate that a large-scale JavaScript attack, stemming from the credit card validation library, is occurring. In addition to updating the CSPs applied to both the first and second web application to block execution of the credit card validation library (e.g., at least until the malicious code is removed), the system is further configured to update a CSP applied to the third web application. The update to the CSP of the third web application may be used as a preventive measure to avoid the possibility of an attack caused by the credit card validation library on the third web application, given the credit card validation library includes the same malicious code running on the first and second web applications.

The system described herein thus provides significant technical advantages over conventional solutions, such as an ability to detect and reduce the harmful effects of individual and/or large-scale scripting attacks on one or more web applications. These technical effects overcome technical problems of insufficient processing capabilities in conventional approaches for identifying and mitigating scripting attacks. For example, the system described herein is able to classify one or more CSP violations as a scripting attack such that immediate and appropriate action may be taken to block execution of the compromised scripting code, which is unlike conventional approaches that are only capable of adjusting CSPs based on individual reported CSP violations.

Further, identifying a potential scripting attack against an individual browser instance is a technically challenging task. For example, this may be analogous to the saying "finding a needle in a haystack." Thus, by configuring the system to analyze various CSP violations to identify a potential larger systematic scripting attack, the system may more easily, and more accurately, identify scripting attacks. As such, more opportunities for preventing the negative effects of such scripting attacks may be realized using the system described herein.

Notably, the improved system described herein can further improve the function of any existing implementations with CSP reporting capabilities enabled, for example, any browser configured to enforce a CSP for a web application executing thereon, and report violations for resources that are not permitted by the applied CSP. In some cases, one or more CSP violations reported in such implementations may be used to determine the existence of an individual and/or widespread scripting attack. In this way, existing implementations may be improved to detect scripting attack instances, automatically neutralize/disable a detected attack, and/or prevent further instances of the attack altogether through appropriate scripting code changes and/or CSP updates.

Example System Configured for Scripting Attack Detection and Mitigation

FIG. 1 illustrates an example system 100 configured for scripting attack detection and mitigation. For example, system 100 may be configured to detect and mitigate JavaScript attacks occurring on one or more web applications. Example system 100 includes a server 102, a browser 104, and a datastore 106. According to embodiments described herein, server 102 and browser 104 may be in communication, using, for example HTTP(S), to at least exchange information about a security policy, such as a CSP, that is to be applied and enforced at browser 104, as well as report violation(s) of one or more directives included in the security policy to enable scripting attack detection and mitigation. Though example embodiments provided herein are described with respect to detecting and mitigating JavaScript attacks using CSP violation reports, other embodiments may involve applying similar techniques to detect and mitigate any type of scripting attack using report(s) indicating violation(s) of other security policies applied to one or more web application(s).

Server 102 is a web server made up of a combination of hardware and software components that together enable hosting websites and web applications. As hardware, server 102 is a computer (e.g., including one or more processors, memory, storage, and networking components) that stores web server software and a website's component files, such as HTML documents, images, CSSs, and/or JavaScript files. The web server software controls how a user accesses hosted files over a network connection, such as the World Wide Web (simply referred to herein as the "web"). The web server software is also comprised of several components, with at least an HTTP(S) server, which is able to understand HTTP(S) and uniform resource locators (URLs) (or uniform resource identifiers (URIs)).

Browser 104, also referred to as a "web browser," is an application used to access and view information on the web. This may include web pages, videos, and/or images. For example, browser 104 uses HTTP(S) to make requests of server 102 on behalf of a user of browser 104. Examples of browser 104 include Microsoft Edge®, Internet Explorer®, Google Chrome®, Mozilla Firefox®, and Apple Safari®.

At a basic level, whenever browser 104 needs a file and/or application that is hosted on server 102, browser 104 requests the file and/or application via HTTP(S). When the request reaches server 102, software components (e.g., an HTTP(S) server) of server 102 accept the request, find the requested document and/or application, and send it back to browser 104, also through HTTP(S). For example, as illustrated in FIG. 1, in response to a request from browser 104 to load one or more web applications 122 from server 102, server 102 performs application initialization at 108. Application initialization, at 108, involves server 102 locating and delivering the requested web application(s) 122 to browser 104 through an interface of browser 104, to thereby allow a user of browser 104 to access these web application(s) 122 (e.g., through a network).

As used herein, a web application 122 is application software that is accessed using any web browser with an active network connection, such as browser 104. One or more programming languages may be used for web application development including, for example, Python®, Java®, hypertext preprocessor (PHP®), HTML, and/or the like. Each language used can be broadly categorized into front and back-end languages. Front-end (or "client-side") development languages are the programming languages used to develop the part of a web application that a user can see, while back-end (or "server-side") development languages are the programming languages used to develop the portion of the web application that a user doesn't see. Example web applications 122 include email, online retail sales, online auctions, instant messaging services, etc. Other example web applications 122 may include TurboTax®, QuickBooks®, and/or ProConnect Tax®, which are all web applications 122 made commercially available by Intuit Inc. of Mountain View, CA.

In some embodiments, server 102 is further configured to define security policies 126 (e.g., CSPs) that are to be applied to web applications 122 executing in browser 104 to thereby enhance the security of such web applications 122. For example, security policy generation and application, at 120, may include server 102 analyzing an information model of a web application 122 and/or scripting code (e.g., JavaScripts) that is expected to execute on the web application 122. Based on this analysis, server 102 may define an initial security policy 126 for web application 122. The security policy 126 may include one or more directives used to declare different resource and/or content restrictions (e.g., a whitelist of resources and/or content) and/or permissibilities for web application 122. For example, the directives may declare which resources (e.g., such as JavaScript, CSS images, etc.) can be loaded, and/or the URLs that they can be loaded from. Server 102 may define these directives in an HTTP response header (e.g., a CSP header) that is sent in a response from server 102 to browser 104. Browser 104 implements the security policy 126 defined for web application 122, executing in browser 104, by adhering to the instructions included in the HTTP response header (e.g., not allowing restricted resources to load in browser 104 for web application 122, etc.).

In some embodiments, security policies generated by server 102 and applied on browser 104 are stored in datastore 106. Datastore 106 is a storage system including one or more physical storage devices, servers, and/or that like that store data and manage access to the stored data. For example, in some embodiments, datastore 106 stores security policy(ies) 126 defined and enforced for web application(s) 122. In some embodiments, datastore 106 stores a database. In some embodiments, datastore 106 uses a file system. In some embodiments, datastore 106 is an object store configured to manage data as objects. In some embodiments, datastore 106 includes multiple physical storage devices, and data stored in the datastore 106 is distributed across the multiple physical storage devices.

In some embodiments, in addition to enforcing security policy(ies) 126 defined for web application(s) 122 executing on browser 104, browser 104 is further configured for security policy violation reporting (e.g., CSP violation reporting). For example, if there is an attempt to load a blocked resource (or blocked content) on browser 104 executing CSP-protected web application(s), a CSP violation results. A CSP violation may indicate a script, a plugin, and/or a resource that is not covered and/or permitted by an applied CSP. At 124, browser 104 performs report generation to generate a report 124 (e.g., a CSP report) indicating the CSP violation for the CSP applied to web application 122. This report 124 is subsequently provided to server 102 to make server 102 aware of such violations. In some cases, browser 104 reports multiple violations for a CSP applied to a single web application 122 executing on browser 104. In some cases, browser 104 reports multiple violation for multiple CSPs applied to multiple web applications 122 executing on browser 104. As described above, other security policy reporting of security policy violations, beyond CSP reporting, may also be considered.

In order to overcome technical problems associated with conventional security policy (e.g., CSP implementations), such as those described above with respect to scripting attack detection and mitigation, some embodiments described herein enable server 102 to further perform report violation analytics, at 110, to assess whether one or more violations, indicated in report(s) 124 received from browser 104, are indicative of a single instance, scripting attack (e.g., for a single web application 122) and/or a larger systematic scripting attack across multiple web applications 122. Report violation analytics, at 110, may include server 102 performing (1) feature extraction at 112, (2) violation classification at 114, (3) score generation at 116, and/or (4) recommendation generation at 118.

For example, server 102 may receive a single, first report 124(1) indicating a violation for a first security policy 126(1) applied to a first web application 122(a). To perform feature extraction, at 112, server 102 may be configured to identify a first plurality of features associated with the first violation.

In some embodiments, one or more of the features identified by server 102 may be features explicitly included in first report 124(1). For example, features identified by server 102 may include information about a type of a browser where the first violation occurred (e.g., Microsoft Edge®, Internet Explorer®, Google Chrome®, Mozilla Firefox®, Apple Safari®, etc.), a version of the browser (e.g., Chrome® version 114.0.5735.106 released Jun. 6, 2023 for Microsoft Windows®, Chrome® version 104.0.5112.102 released May 30, 2022 for Microsoft Windows®, etc.), and/or an internet protocol (IP) address of the browser. As another example, first report 124(1) may include information about an operating system (OS) where the first violation occurred (e.g., Microsoft Windows®, MacOS®, etc.). Server 102 may determine this information based on information included in first report 124(1) and/or based on determining which browser 104 transmitted first report 124(1) to server 102.

Other features included in first report 124(1) that may be identified by server 102 include information about a URL of a resource that was prevented from loading on the browser and/or a URL of a document in which the first violation occurred. As another example, first report 124(1) may include an analysis performed for a JavaScript sample, a user-agent request header, and/or an identification of the first security policy 126(1) for which the first report 124(1) was generated. An example report 124, having one or more of these features, is described in detail below with respect to FIG. 4. One or more of these features may be extracted from first report 124(1) and identified as feature(s) associated with the first violation.

In some embodiments, feature extraction, at 112, further involves server 102 identifying additional features for the first violation using one or more of the features identified above (e.g., features included in first report 124(1), such as the type of a browser where the first violation occurred, the version of the browser, the IP address of the browser, the OS where the first violation occurred, a URL of a resource that was prevented from loading on the browser, the URL of a document in which the first violation occurred, the JavaScript sample analysis, the user-agent request header, and/or the identification of the first security policy). In some embodiments, server 102 performs a domain name system (DNS) lookup, a reverse DNS (rDNS) lookup, a WHOIS (e.g., an internet service and protocol pronounced as the phrase "who is") lookup, a nameserver lookup, and/or other lookup procedures to identify these additional features associated with the first violation.

For example, in some embodiments, server 102 determines the IP address of the browser based on this information being included in first report 124(1) and/or based on determining which browser 104 transmitted first report 124(1) to server 102. Server 102 may use the IP address of the browser to determine a domain, also referred to as a "domain name," associated with the IP address. For example, server 102 may perform an rDNS lookup to execute a DNS query for a domain associated with the IP address of the browser. Alternatively, in some embodiments, server 102 determines the domain using a URL of a resource that was prevented from loading on the browser, when this URL is included in the first report 124(1). As used herein, a domain is a part of web address nomenclature used to find a website or a page of a website (e.g., comes after the "www." in a web address).

Server 102 may use the determined domain to identify one or more additional features associated with the first violation. For example, server 102 may determine a content delivery network (CDN) score associated with the domain. If the CDN score is determined for the domain and the domain is a well-known CDN, the determined CDN score may be high, given a large number of websites generally use a CDN to serve content.

As another example, server 102 may determine an Alexa 10k score associated with the domain. If the Alexa 10k score is determined for the domain and the domain is well-known across the world, i.e., in the top 10,000 known domains, also referred to as "Alexa 10k," the determined Alexa 10k score may be high, due to the fact that a large number of websites generally connect with these popular/well-known websites.

In other examples, server 102 may determine a malicious score (also referred to as an "unsafe domain score") associated with the domain and/or an alias score associated with the domain. A malicious score determined for the domain may indicate how likely the domain is to be malicious. The malicious score may be based on a proximity of the domain to other known-"bad" domains and/or how closely the domain resembles other malicious domains, for example, used for spam, phishing, and/or malware. In some embodiments, the malicious score is based on an external threat feed maintained by external security companies. The main function of these external security companies is to provide information (e.g., in the external threat feed) about different domains, to aid others in determining if a particular domain is risky or not.

As another example, server 102 may determine a reputation score associated with the domain. The reputation score associated with the domain may be based on the CDN score associated with the domain, the Alexa 10k score associated with the domain, the malicious score associated with the domain (e.g., based on the external threat feed), and/or whether the domain has been registered for a sufficient amount of time such that the domain is unlikely to be malicious/unsafe. In some embodiments, different weights are applied to each of these factors when determining the reputation score associated with the domain. In some embodiments, other factors are also considered when determining the reputation score for the domain. In some embodiments, if at least one of these factors indicates that the domain is compromised and/or has a bad reputation, the overall reputation score is determined solely based on this information (e.g., the determined reputation score indicates a poor reputation). In some embodiments, the reputation score is further determined based on one or more historical scores previously determined for the domain.

In other examples, server 102 may determine a registration country (e.g., USA, Canada, France, etc.), a registration date, and/or other registration information associated with the domain. One or more of these additional features determined for the domain (e.g., the reputation score, the CDN score, etc.) may be identified as feature(s) associated with the first violation (e.g., during feature extraction performed at 112).

In some embodiments, additional features for the first violation, determined by server 102, using the determined domain include a reputation score for a subdomain associated with the domain. For example, server 102 may be configured to determine a subdomain associated with the domain, and further determine a reputation score for this subdomain.

In some embodiments, additional features for the first violation, determined by server 102, using one or more of the features included in first report 124(1) (or based on the browser that transmitted first report 124(1)) include a comparison of a first domain and a second domain. The first domain may be determined, by server 102, using the blocked URL (e.g., a URL of a resource that was prevented from loading on the browser and/or the URL of a document in which the first violation occurred) included in first report 124(1). The second domain may be determined by server 102 performing a sequence of DNS and rDNS lookups. For example, server 102 may (1) perform a first DNS lookup using the first domain to identify an associated IP address and (2) subsequently perform an rDNS using the identified IP address to obtain the second domain. Server 102 may compare the first and second domain. The additional features for the first violation may include this comparison.

In some embodiments, feature extraction, at 112, involves server 102 identifying additional features for the first violation, which include a reputation score and/or a malicious score for an IP address of the browser. For example, server 102 determines the IP address of the browser based on this information being included in first report 124(1) and/or based on determining which browser 104 transmitted first report 124(1) to server 102. Alternatively, server 102 determines the IP address of the browser by performing a DNS lookup of a blocked URL included in first report 124(1)(e.g., when this blocked URL is included in first report 124(1)). Server 102 then determines the reputation score and/or the malicious score associated with this determined IP address.

In some embodiments, additional features for the first violation, determined by server 102, using one or more of the features included in first report 124(1) (or based on the browser that transmitted first report 124(1)) include a reputation score for nameserver records. In particular, in some embodiments, server 102 determines a domain associated with a blocked URL included in first report 124(1), and further obtains nameserver records for the determined domain. Server 102 determines a reputation score for the nameserver records and uses this as one of the features extracted for the first violation.

In some embodiments, additional features for the first violation, determined by server 102, using one or more of the features included in first report 124(1) include a comparison of a JavaScript sample analysis included in first report 124(1) with an original JavaScript sample analysis. For example, server 102 may be configured to perform this comparison.

In some embodiments, server 102 generates additional features for the first violation. For example, server 102 may generate a loading sequence based on, at least, the first violation. As such, features associated with the first violation may include the generated loading sequence.

As another example, server 102 may identify one or more scripts, such as JavaScripts, running when the first violation occurred and generate behavior of the one or more scripts when the first violation occurred based on, at least, the first violation. As such, features associated with the first violation may include the generated script behavior (e.g., generated JavaScript behavior).

It is noted that the above-described features are only example features that may be determined by server 102 (e.g., based on receiving first report 124(1)). In other words, the above-described features are not an exhaustive list, and many other features may be determined and considered by server 102.

Using the plurality of features identified for the first violation, at 112, server 102 may, or may not, classify the first violation as a JavaScript attack (e.g., when performing violation classification at 114).

In some embodiments, server 102 classifies the first violation by generating a score for the first violation using the first plurality of features (e.g., when performing score generation at 116). For example, server 102 may use a model configured to generate a score indicative of a scripting attack, to process the features identified for the first violation and thereby generate a score for the first violation. In other words, the first violation is given a score regarding the probability of the single browser session (e.g., for which the first violation was generated) being compromised and/or a single instance scripting attack occurring. Processing the identified features using the model may include applying different weights (e.g., pre-determined weights) to each of the identified features to predict the score. The predicted score may be compared against an individual attack threshold (e.g., pre-determined/pre-configured threshold) to determine whether the first violation should be classified as a scripting attack or not.

If the predicted score is less than the individual attack threshold, then server 102 does not classify the first violation as a scripting attack. In such cases, the first security policy 126(1) may or may not be updated. For example, first security policy 126(1), applied to first web application 122(1), may be updated such that future violations, similar to the first violation, are not generated by browser 104 (e.g., make first security policy 126(1) less strict). In some cases, this update may be recommended by server 102, when performing recommendation generation at 118, based on analyzing the plurality of features associated with the first violation. In some alternative cases, because no attack is determined by server 102 based on only analyzing the first report 124(1)/first violation, server 102 may recommend (e.g., when performing recommendation generation at 118) that no further action be taken to update first security policy 126(1) applied to first web application 122(1).

On the other hand, if the predicted score is equal to or above the individual attack threshold, then server 102 classifies the first violation as a scripting attack (e.g., such as a JavaScript attack). Server 102 may then take action to mitigate the scripting attack on the first web application 122(1). In some cases, recommended action to mitigate the scripting attack (e.g., determined at 118) may include updating first security policy 126(1), applied to first web application 122(1), to prohibit the execution of scripting code associated with the scripting attack (e.g., this update may be applied when performing security policy generation and application at 120). In some cases, recommended action to mitigate the scripting attack (e.g., determined at 118) may include updating first security policy 126(1), applied to first web application 122(1), to remove the attacking scripting vector altogether from first web application 122(1). In some cases, recommended action to mitigate the scripting attack (e.g., determined at 118) may include preventing further instances of the attack through appropriate scripting code changes (e.g., JavaScript code changes).

As described above, system 100 is not only configured to assess whether a single instance, scripting attack is occurring on a web application 122, but may also be configured to assess whether a larger systematic scripting attack (e.g., widespread scripting attack) is occurring across multiple web applications 122. As such, if the predicted score for a single violation is less than the individual attack threshold and server 102 does not classify the first violation as a scripting attack, server 102 may additionally determine whether multiple violations, including the first violation, indicate that a large-scale scripting attack is occurring.

For example, server 102 may receive a plurality of reports 124 indicating a plurality of violations for one or more security policies 126 (e.g., CSPs) applied to one or more web applications 122 (e.g., including the first report 124(1) indicating the first violation for the first security policy 126(1) applied to the first web application 122(1), in the above example).

When performing feature extraction, at 112, server 102 may identify, for each of the plurality of violations, a plurality of features. The features may include one or more of the features described in detail above. Further, feature extraction, at 112, may involve server 102 analyzing together the individual features associated with each of the plurality of violations to determine the probability of a large-scale scripting attack.

In some embodiments, analyzing together the individual features associated with each of the plurality of violations enables server 102 to (1) determine a percentage of violations received by server 102 having a common scripting library (e.g., JavaScript library) among them and/or (2) determine a percentage of violations received by server 102, for different web applications 122, having a common scripting library among them. Violations received for a large number of web applications 122 having a same scripting library may lead server 102 to infer that these violations are being generated due to malicious code present in the scripting library shared among the different web applications 122 (e.g., thereby increasing the likelihood that a widespread scripting attack is indeed occurring).

In some embodiments, analyzing together the individual features associated with each of the plurality of violations enables server 102 to (1) determine a percentage of violations received by server 102 occurring on a same OS and/or (2) determine a percentage of violations received by server 102, for different web applications 122, occurring on a same OS. For example, server 102 may receive thirty reports 124 indicating thirty violations for security policies 126 applied to five different web applications 122. Three of the thirty violations are generated for a first security policy 126(1) applied to a first web application 122(1), three of the thirty violations are generated for a second security policy 126(2) applied to a second web application 122(2), three of the thirty violations are generated for a third security policy 126(3) applied to a third web application 122(3), three of the thirty violations are generated for a fourth security policy 126(4) applied to a fourth web application 122(4), and the remaining eighteen violation are generated for a fifth security policy 126(5) applied to a fifth web application 122(5). The first web application 122(1) may be executing on a first OS; thus, the three violations generated for the first security policy 126(1) applied to the first web application 122(1) all occurred on the first OS. The second, third, fourth, and fifth web application 122(2)-(5) may be executing on a second OS; thus, the twenty-seven violations generated for these web applications 122(2)-(5) all occurred on the second OS. When analyzing together each of these violations received by server 102, server 102 may determine that 90% of the violations occur on a same OS (e.g., 27 violations out of 30 violations occur on the second OS, (27/30)=90%). Further, server 102 may determine that 80% of the violations, received for different web applications 122, occur on a same OS (e.g., violations for 4 web applications out of the 5 total web applications occur on the second OS, (4/5)=80%).

In some embodiments, analyzing together the individual features associated with each of the plurality of violations enables server 102 to determine a percentage of violations received by server 102 occurring on a same browser and/or a same browser version (e.g., browser and/or browser version common to the violations). In some embodiments, analyzing together the individual features associated with each of the plurality of violations enables server 102 to determine a percentage of violations received by server 102, for different web applications 122, occurring on a same browser and/or a same browser version.

In some embodiments, analyzing together the individual features associated with each of the plurality of violations enables server 102 to determine a geographical region common to each of the violations. For example, a first web application 122(1) and a second web application 122(2) may be executing on multiple browsers 104 throughout the United Kingdom. The first web application 122(1) and the second web application 122(2) may use a same credit card validation library written in JavaScript. A large number of first violations may be reported by each of the browsers 104 in the United Kingdom, where the first web application 122(1) is executing. Further, a large number of second violations may be reported by each of the browsers 104 in the United Kingdom, where the second web application 122(2) is executing. In this example, a credit card payment web page of the first web application 122(1) and a credit card payment web page of the second web application 122(2) may be causing the large number of first and second violations to be generated for each web application 122, respectively. Analyzing features for each of these violations together may allow server 102 to infer that the credit card validation library, e.g., a common JavaScript library present on web pages associated with both first web application 122(1) and second web application 122(2), is likely compromised. Further, by analyzing the features together, server 102 may determine that only JavaScript libraries executing on United Kingdom browsers are compromised, given all of the violations received occurred on browsers present in the United Kingdom.

In some embodiments, analyzing together the individual features associated with each of the plurality of violations enables server 102 to determine a web application 122 common to each of the violations. A large number of violations received for a single web application 122, executing on multiple browsers and, in some cases, in multiple geographic locations, may lead server 102 to infer that a scripting attack is originating from the single web application 122.

It is noted that the above-described features used to determine the probability of a large-scale JavaScript attack are only example features that may be determined by server 102 (e.g., based on analyzing features for a plurality of violations). In other words, the above-described features used to determine the probability of a large-scale JavaScript attack are not an exhaustive list, and many other features may be determined and considered by server 102.

Using the plurality of features identified, at 112, for the plurality of violations, server 102 may, or may not, classify the plurality of violations as a scripting attack (e.g., when performing violation classification at 114). Based on the determined classification, server 102 may generate one or more recommendations, at 118. In some embodiments (e.g., where a scripting attack is not detected), the recommendations may include a recommendation not to update any security policy 126 (e.g., CSP). In some embodiments (e.g., where a scripting attack is detected), the recommendations may include a recommendation to update one or more security policies 126 (e.g., CSPs) applied to one or more of the web applications 122 where the violations were originally generated. The recommendation may specify the particular security policies 126 that are to be updated.

In some embodiments (e.g., where a scripting attack is detected), the recommendations may include a recommendation to update one or more security policies 126 (e.g., CSPs) applied to one or more other web applications 122 for which the violations (e.g., analyzed by server 102) were not generated. In some embodiments, the one or more other web applications 122 are applications that are running a common scripting library as the web applications 122 determined to be under attack. In some embodiments, the one or more other web applications 122 are applications that are running on a same OS, browser 104, and/or browser 104 version as the web applications 122 determined to be under attack. In some embodiments, the one or more other web applications 122 are applications that are executing on browsers 104 in a same geographical region as browsers 104 used to execute the web applications 122 determined to be under attack. In some embodiments, the one or more other web applications 122 are a same web application as the web applications 122 determined to be under attack (e.g., all are TurboTax® applications).

Figure 2:
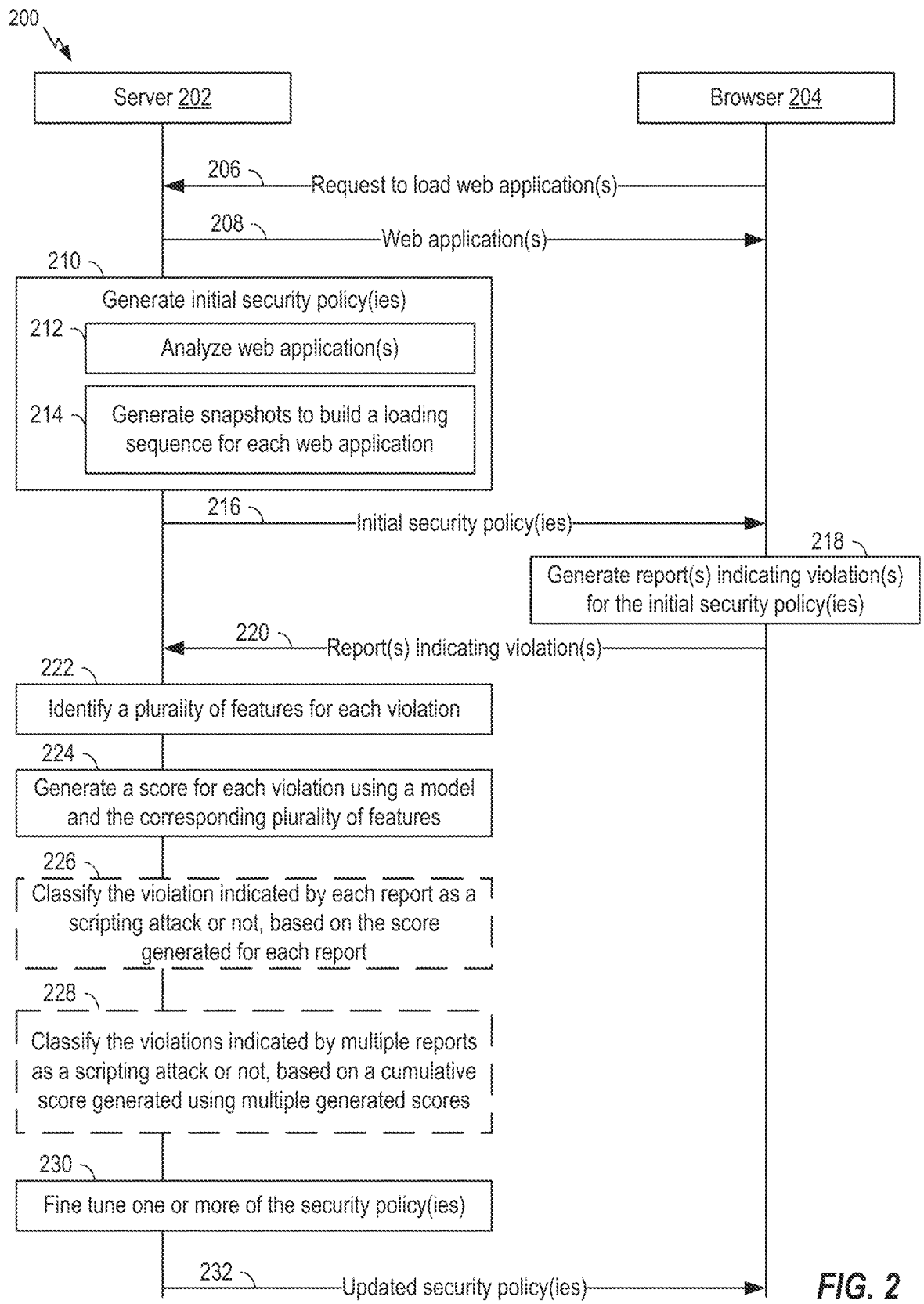
FIG. 2 is a process flow for communication between a server and a browser for detecting and mitigating scripting attacks.

Example Operations of Entities Performing Scripting Attack Detection and Mitigation FIG. 2 is a process flow 200 for communication between a server and a browser 204 for detecting and mitigating scripting attacks. In some embodiments, server 202 is an example of server 102 depicted and described with respect to FIG. 1. Similarly, browser 204 may an example of browser 104 depicted and described with respect to FIG. 1.

Figure 3A:
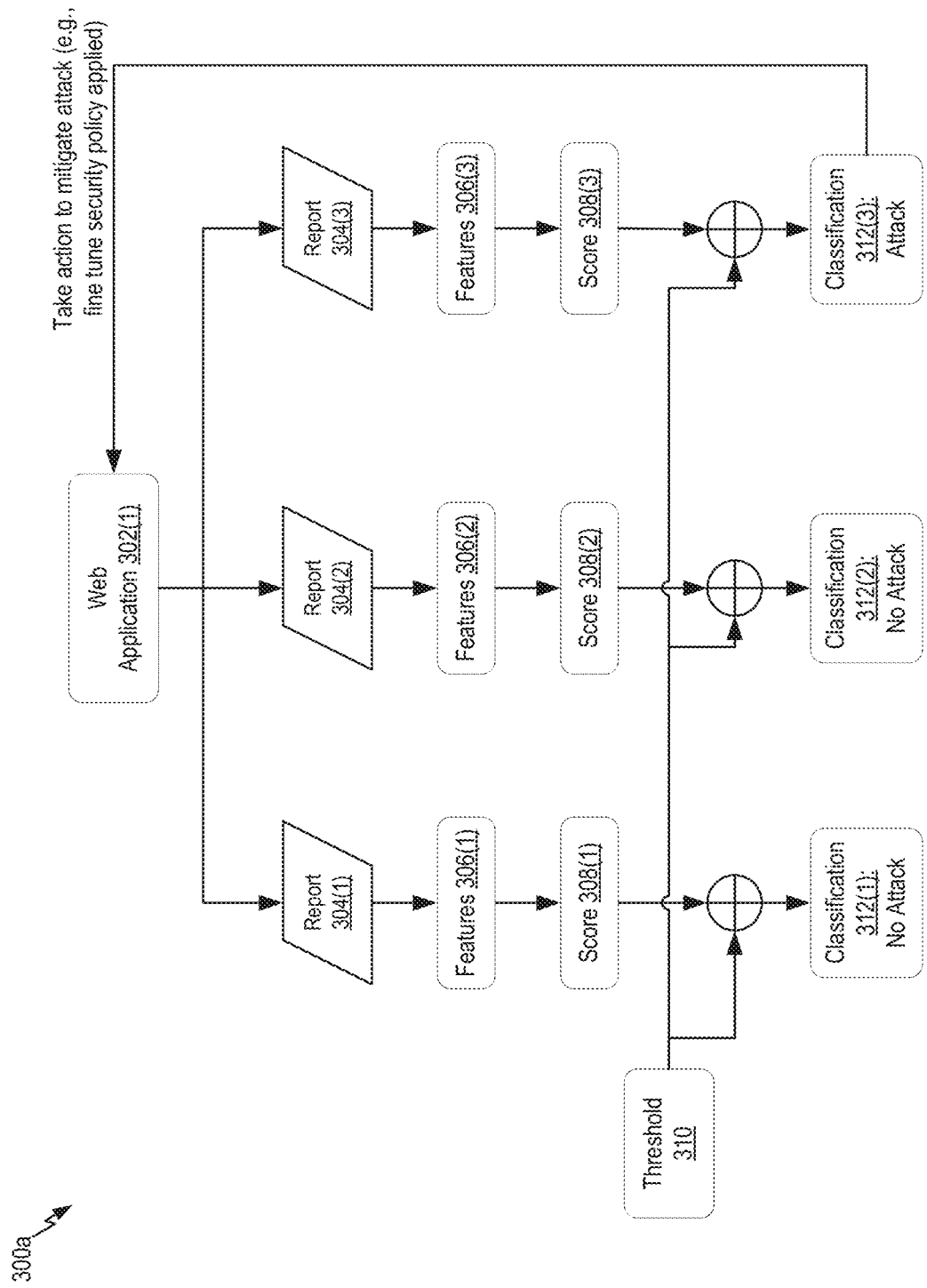
FIG. 3A illustrates example classification of individual content security policy (CSP) violations as a JavaScript attack.
Figure 3B:
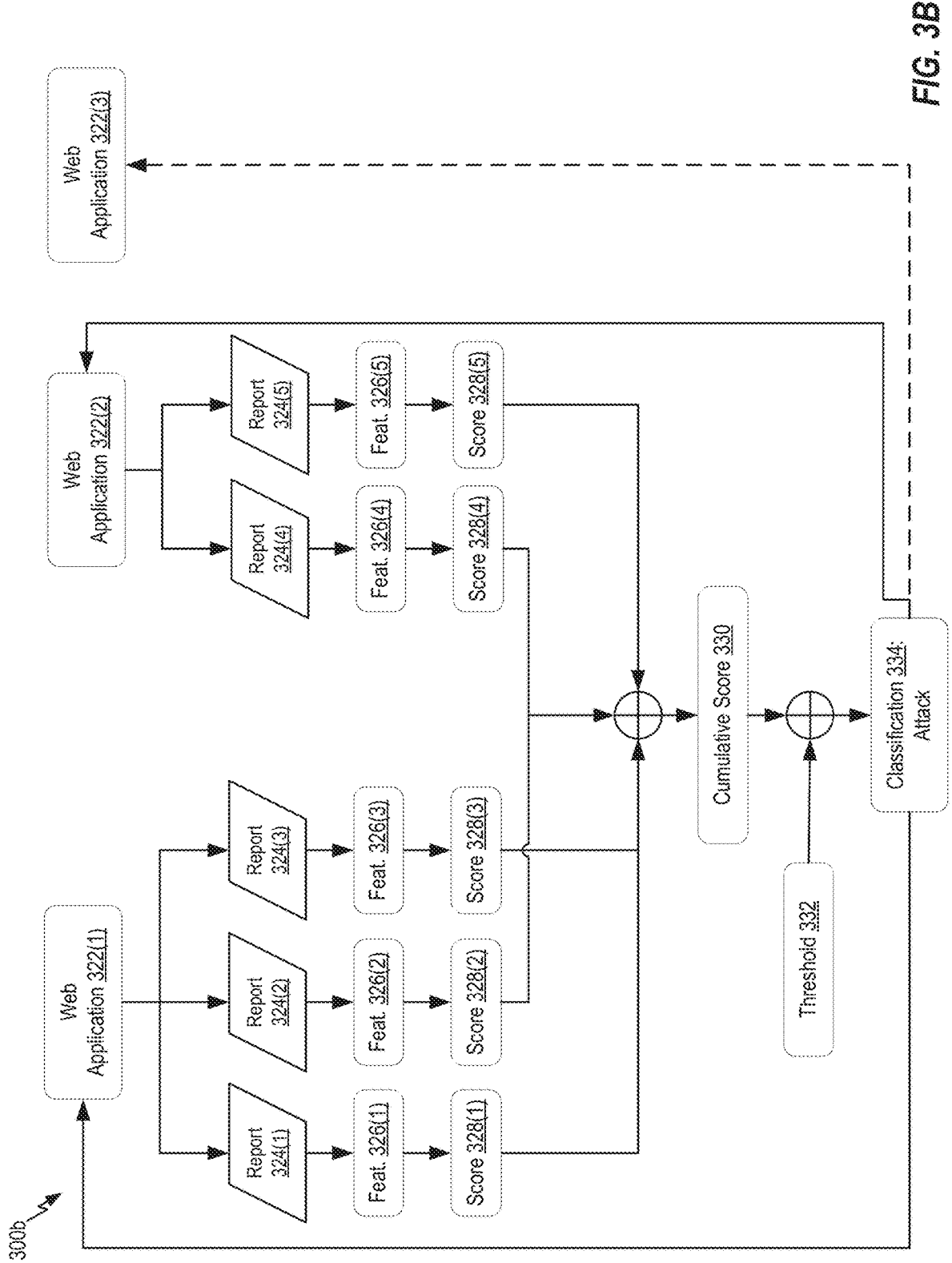
FIG. 3B illustrates example classification of multiple CSP violations as a large-scale JavaScript attack.

FIG. 3A illustrates example classification 300a of a single security policy violation as an isolated scripting attack on a single web application. FIG. 3B illustrates example classification 300b of multiple security policy violations as a large-scale scripting attack across multiple web applications.

Example scripting attack classifications, specifically JavaScript attack classifications, illustrated in FIG. 3A and FIG. 3B may be based on example operations of server 202 and browser 204 depicted in process flow 200 of FIG. 2. FIGS. 2 and 3A-3B are described in conjunction below.

As depicted in process flow 200 of FIG. 2, at step 206, browser 204 sends, to server 202, a request to load one or more web applications (e.g., such as web applications 122 in FIG. 1). As described above, browser 204 may request web application(s) from server 202 via HTTP(S).

In some cases, browser 204 sends a request, to server 202 at step 206, to load a single web application on browser 204. For example, the request may call for server 102 to load, on browser 204, web application 302(1) illustrated in FIG. 3A. Though not meant to be limiting to this particular example, web application 302(1) may be TurboTax®.

In some other cases, browser 204 sends a request, to server 202 at step 206, to load multiple web application on browser 204. For example, the request may call for server 102 to load, on browser 204, three web application 322(1), 322(2), and 322(3) illustrated in FIG. 3B. Though not meant to be limiting to this particular example, web application 322(1) may be TurboTax®, web application 322(2) may be QuickBooks®, and web application 322(3) may be ProConnect Tax®.

In response to receiving the request to load web application(s) on browser 204, at step 208, server 202 locates and delivers the requested web application(s) to browser 104 through an interface of browser 104, to thereby allow a user of browser 104 to access these web application(s) 122 (e.g., through a network).

At step 210, server 202 generates one or more initial security policies. Specifically, server 202 may generate a security policy for each web application requested to be loaded on browser 204 (e.g. where browser 204 requests server 202 to load three web applications on browser 204, three security policies may be generated). In some embodiments, the generated initial security policies are CSPs.

Generating a security policy for a web application may first include analyzing the web application at step 212. For example, a web application scanner may be used to scan all, or a sufficient portion, of the web application software and analyze in-depth each file (e.g., HTML documents, images, CSSs, JavaScript files, etc.) it finds, to generate an application information model for the web application. Scripting templates (e.g., JavaScript templates) may also be created for the web application to illustrate original scripting behavior of the web application. Further, at step 214, server 202 may generate one or more snapshots for the web application to build a loading sequence for the web application. Web application snapshots provide the ability to capture a point-in-time archive of live web pages.

In FIG. 3A, because only one web application (e.g., web application 302(1) or TurboTax®) was requested and loaded on browser 204, steps 212 and 214 may be performed only once to generate a single security policy for web application 302(1). On the other hand, in FIG. 3B, because three web applications (e.g., web applications 322(1)-322(3) or TurboTax®, QuickBooks®, and ProConnect®) were requested and loaded on browser 204, steps 212 and 214 may be performed three times to generate three security policies.

At step 216, server 202 defines the security policy (e.g., CSP) to be applied to each web application in one or more HTTP response headers (e.g., CSP headers), and transmits these headers to browser 204. Browser 204 implements the security policy defined for each web application loaded and executing on browser 204, by adhering to the instructions included in the one or more HTTP response headers. For example, the instructions may indicate resource(s) and/or content that should not be loaded for each web application executing on browser 204.

In some cases, there may be one or more attempts to load block resource(s) and/or content on browser 104. As such, at step 218, browser 204 may generate a report for each violation of each security policy detected by browser 204. At step 220, browser 204 provides the generated report(s) to server 202 for analysis.

For example, in FIG. 3A, three attempts to load blocked resources (e.g., blocked via directives listed in a security policy defined and applied to web application 302(1)) results in browser 204 generating three reports 304(1)-304(3).

As another example, in FIG. 3B, three attempts to load blocked resources (e.g., blocked via directives listed in a security policy defined and applied to web application 322(1)) results in browser 204 generating three reports 324(1)-324(3). Further, two attempts to load blocked resources (e.g., blocked via directives listed in a security policy defined and applied to web application 322(2)) results in browser 204 generating two reports 324(4)-324(5). Because no violations of a security policy applied to web application 322(3) are detected, no reports may be generated for web application 322(3).

Figure 4:
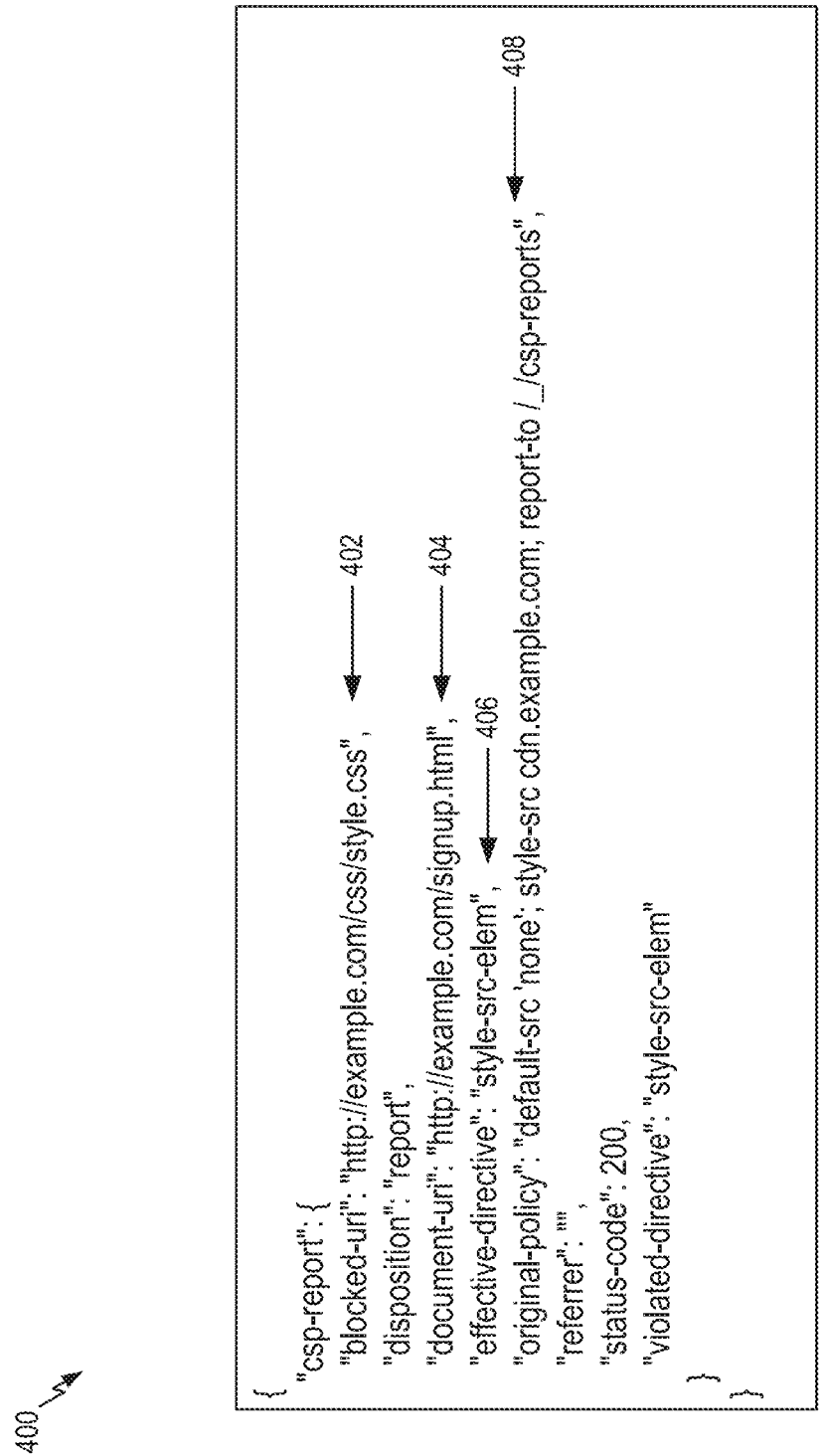
FIG. 4 illustrates an example CSP report.

An example report that may be generated by browser 204 is illustrated as CSP report 400 in FIG. 4. As illustrated, a CSP report generated by a browser may include information about a blocked URL (shown as "blocked-uri" at 402), a blocked document URL (shown as "document-uri" at 404), an effective directive (shown as "effective-directive" at 406), and/or an indication of the original security policy for which the report/violation was generated (shown as "original-policy" at 408). As described above, information about the blocked URL may identify a URL of a resource that was prevented from loading on the browser (e.g., based on directives defined in the identified original security policy at 408). Further, information about a blocked document may identify a document in which the violation occurred (e.g., based on directives defined in the identified original security policy at 408).

It is noted that the above-described CSP report is only an example security report that may be generated by a browser (e.g., such as browser 204), and additional information (or less information) may be included in the CSP report and/or other security reports generated by a browser for a detected security policy violation.

In response to receiving the report(s) from browser 204 (e.g., each indicating a single security policy violation), at step 222, server 202 identifies a plurality of features for each violation. As described above, the plurality of features may include features contained within a report, such as a URL of a resource that was prevented from loading on the browser, a URL of a document where a violation was detected, an identification of an applied security policy, etc. The plurality of features may also include information about a blocked domain reputation score, a blocked domain CDN score, a blocked IP reputation score, etc. Further in some embodiments where multiple reports are received by server 202, the identified features may include features indicative of a probability of a large-scale scripting attack (e.g., a percentage of violations received by server 102 having a common scripting library among them, a percentage of violations received by server 102 occurring on a same OS, etc.). At step 224, server 202 generates a score for each violation using a model and the plurality of features identified for each violation. The model may be configured to generate a score indicative of a scripting attack.

For example, in FIG. 3A, a plurality of features 306(1) are identified for the violation indicated in report 304(1), a plurality of feature 306(2) are identified for the violation indicated in report 304(2), and a plurality of features 306(3) are identified for the violation indicated in report 304(3). Plurality of features 306(1) may be processed by a model to generate a score 308(1) for the violation indicated in report 304(1). Similar steps may be used to generate scores 308(2) and 308(3) for violations indicated in reports 304(2) and 304(3), respectively.

In FIG. 3B, similar steps are performed to identify a plurality of features (e.g., features 326(1)-326(5)) and generate a score (e.g., scores 328(1)-238(5)) for each violation indicated in the reports (e.g., reports 324(1)-324(5)).

In some embodiments, server 202 is configured to only detect single instances of scripting attacks. Accordingly, at 226, server 202 individually classifies the violation indicated by each report as a scripting attack or not, based on the score generated for each report. For example, in FIG. 3A, server 202 determines whether score 308(1) associated with the violation indicated in report 304(1) is above or equal to threshold 310 (e.g., an individual scripting attack threshold), determines whether score 308(2) associated with the violation indicated in report 304(2) is above or equal to threshold 310, and determines whether score 308(1) associated with the violation indicated in report 304(3) is above or equal to threshold 310. In this example, server 202 determines that only score 308(3) is above or equal to threshold 310, and thus, only classifies the violation indicated in report 304(3) as a scripting attack (e.g., "Classification 312(3): Attack"). Other violations indicated in reports 304(1) and 304(2) are not classified as scripting attacks (e.g., "Classification 312 (1): No Attack" and "Classification 312(2): No Attack").

In some other embodiments, server 202 is configured to only detect widespread scripting attacks (e.g., across multiple web applications). Accordingly, instead of performing step 226, server 202 performs step 228, where server 202 classifies the violations indicated by multiple reports as a scripting attack or not, based on a cumulative score generated using multiple of the generated scores (e.g., individually generated for each violation at step 224). For example, in FIG. 3B, server 202 calculates a cumulative score 330 for score 328(1) through 328(5). It should be noted that in other examples, less than all of the scores 328(1) through 328(5) (but more than one score) may be used to calculate cumulative score 330. Using cumulative score 330, server 202 determines whether cumulative score 330 is above or equal to threshold 332 (e.g., a large-scale scripting attack threshold, also referred to herein as a widespread scripting attack threshold). In this example, server 202 determines that cumulative score 330 is above or equal to threshold 332, and thus, classifies the multiple violations indicated in reports 324(1)-234(5) as a scripting attack.

In some other embodiments, server 202 is configured to detect both single instances of scripting attacks, as well as widespread scripting attacks (e.g., across multiple web applications). Accordingly, server 202 may perform both steps 226 and 228 illustrated in FIG. 2. In some cases, however, server 202 may only perform step 228 after determining that none of the violations alone are indicative of a scripting attack (e.g., a score for each violation is below the individual scripting attack threshold).

At step 230, server 202 determines whether to fine tune, as well as how much to fine tune, one or more of the security policy(ies) initially provided to browsers 204, at step 216. At step 232, server 202 provides updated security policy(ies) to browser 204.

For example, based on classifying the violation indicated in report 304(3) as a scripting attack in FIG. 3A, server 202 may take action to mitigate the attack. Taking action to mitigate the attack may include updating the security policy applied to web application 302(1) to prohibit the execution of scripting code associated with the scripting attack or remove the attacking scripting vector altogether from web application 302(1).

As another example, based on classifying the violation indicated in reports 324(1)-324(5) as a scripting attack in FIG. 3A, server 202 may take action to mitigate the attack on both web application 322(1) and web application 322(2). Similar to FIG. 3A, mitigating the attack on both web application 322(1) and web application 322(2) may include updating the security policy applied to web application 322(1) and web application 322(2) to prohibit the execution of scripting code associated with the attack or remove the attacking scripting vector altogether from application 322(1) and web application 322(2). In some embodiments, mitigating the attack may further involve taking action to mitigate the attack on web application 322(3). For example, although violations were not detected on web application 322(3), web application 322(3) may be executing scripting code (e.g., a scripting library) similar to web application 322(1) and web application 322(2) that is determined to be malicious (and contributing to the scripting attack on these applications). As such, preventive measures may be taken to avoid any bad outcomes caused by this malicious code executing on web application 322(3).

Example Methods for Detecting and Mitigating Scripting Attacks

Figure 5:
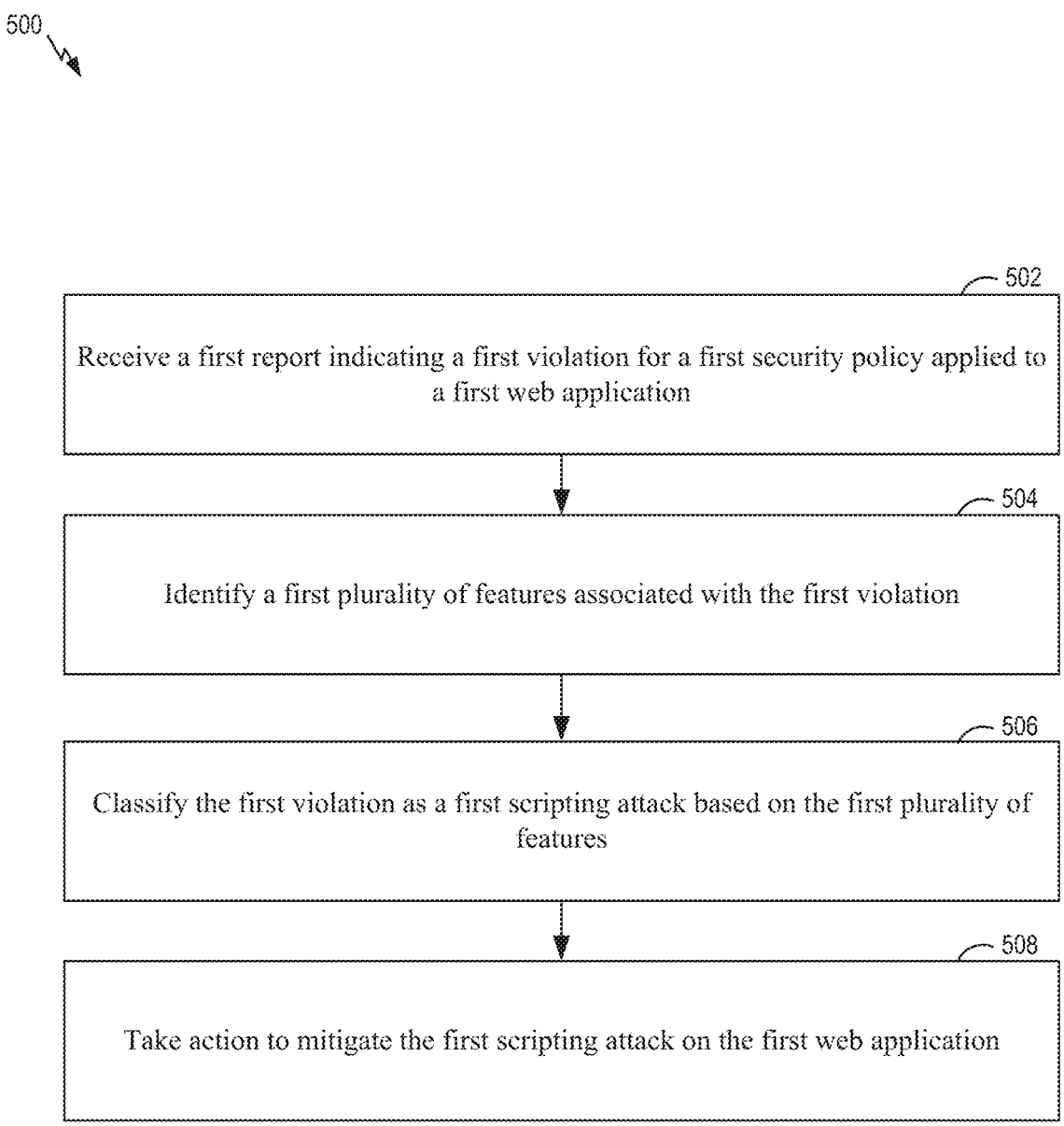
FIG. 5 illustrates an example method for scripting attack detection and mitigation.

FIG. 5 illustrates an example method 500 for Scripting attack detection and mitigation. For example, method 500 may be performed to classify a single security policy violation (e.g., a CSP violation for a CSP applied to a web application) as a scripting attack (e.g., a JavaScript attack), and take action to mitigate this attack at the web application, when necessary. Method 500 may be performed by one or more processor(s) of a computing device, such as processor(s) 702 of processing system 700 described below with respect FIG. 7.

Method 500 begins at step 502 with receiving a first report indicating a first violation for a first security policy applied to a first web application.

Method 500 then proceeds to step 504 with identifying a first plurality of features associated with the first violation.

Method 500 then proceeds to step 506 with classifying the first violation as a first scripting attack based on the first plurality of features.

Method 500 then proceeds to step 508 with taking action to mitigate the first scripting attack on the first web application.

In some aspects, classifying the first violation as the first scripting attack based on the first plurality of features includes: processing, with a model configured to generate a score indicative of a scripting attack, the first plurality of features and thereby generate a first score for the first violation; determining the first score for the first violation is above an individual scripting attack threshold; and classifying the first violation as the first scripting attack based on the first score for the first violation being above the individual scripting attack threshold.

In some aspects, the first plurality of features associated with the first violation include a plurality of features included in the first report and including at least one of: a type of a browser where the first violation occurred, a version of the browser, an internet protocol (IP) address of the browser, an operating system (OS) where the first violation occurred, a uniform resource locator (URL) of a resource that was prevented from loading on the browser, a URL of a document in which the first violation occurred, a scripting code sample analysis, a user-agent request header, or an identification of the first security policy.

In some aspects, the first plurality of features associated with the first violation includes at least one of the IP address of the browser or the URL of the resource that was prevented from loading on the browser, and method 500 further includes: determining a domain associated with the IP address or the URL; and determining, for the domain, at least one of: a reputation score, a content delivery network (CDN) score, an Alexa 10k score, a malicious score, an alias score, a registration country, a registration date, or registration information, wherein the first plurality of features further includes at least one of the reputation score, the CDN score, the Alexa 10k score, the malicious score, the alias score, the registration country, the registration date, or the registration information.

In some aspects, method 500 further includes determining a subdomain associated with the domain; and determining a reputation score for the subdomain, where the first plurality of features further includes the reputation score for the subdomain.

In some aspects, the first plurality of features associated with the first violation includes the IP address of the browser and the URL of the resource that was prevented from loading on the browser, and method 500 further includes: determining a first domain associated with the URL; determining a second domain associated with the URL by performing a sequence of domain name system (DNS) and reverse DNS lookups; and determining whether the first domain and the second domain are equal.

In some aspects, the first plurality of features associated with the first violation includes at least one of the IP address of the browser or the URL of the resource that was prevented from loading on the browser, and method 500 further includes: determining the IP address of the browser; and determining, for the IP address, at least one of: a reputation score, or a malicious score, wherein the first plurality of features further includes at least one of the reputation score or the malicious score for the IP address.

In some aspects, the first plurality of features associated with the first violation includes the URL of the resource that was prevented from loading on the browser, and method 500 further includes: performing a nameserver lookup using the URL to obtain nameserver records for a domain associated with the URL; and determining a reputation score for the nameserver records, wherein the first plurality of features further includes the reputation score for the nameserver records.

In some aspects, the first plurality of features associated with the first violation includes the scripting code sample analysis, and method 500 further includes comparing the scripting code sample analysis with an original scripting code sample analysis.

In some aspects, method 500 further includes generating a loading sequence based on, at least, the first violation, wherein the first plurality of features includes the loading sequence.

In some aspects, method 500 further includes identifying one or more scripts running when the first violation occurred; and generating behavior of the one or more scripts based on the first violation, wherein the first plurality of features includes the behavior of the one or more scripts.

In some aspects, taking action to mitigate the first scripting attack on the first web application includes: updating the first security policy applied to the first web application to prohibit execution of scripting code associated with the first scripting attack; or updating the first security policy applied to the first web application to remove the scripting code.

In some aspects, method 500 further includes receiving a second report indicating a second violation for the first security policy applied to the first web application and one or more third reports indicating one or more third violations for one or more third security policies applied to one or more second web applications; identifying a second plurality of features associated with the second violation and third pluralities of features associated with the one or more third violations; classifying the second violation and the one or more third violations as a second scripting attack based on the second plurality of features and the third pluralities of features; and based on classifying the second violation and the one or more third violations as the second scripting attack, taking action to mitigate the second scripting attack on the first web application and the one or more second web applications.

In some aspects, classifying the second violation and the one or more third violations as the second scripting attack based on the second plurality of features and the third pluralities of features includes: processing, with a model configured to generate a score indicative of a scripting attack, the second plurality of features and thereby generate a second score for the second violation; processing, with the model, the third pluralities of features and thereby generate one or more third scores for the one or more third violations; generating a cumulative score based on the second score and one or more third scores; determining the cumulative score is above a widespread scripting attack threshold; and classifying the second violation and the one or more third violations as the second scripting attack based on the cumulative score being above the widespread scripting attack threshold.

In some aspects, method 500 further includes determining the second violation is not classified as the second scripting attack based on only the second plurality of features, wherein the classifying the second violation and the one or more third violations as the second scripting attack is performed based on the determining the second violation is not classified as the second scripting attack based on only the second plurality of features.

In some aspects, determining the second violation is not classified as the second scripting attack based on only the second plurality of features includes: processing, with a model configured to generate a score indicative of a scripting attack, only the second plurality of features and thereby generate a second score for the second violation; determining the second score for the second violation is below an individual scripting attack threshold; and determining the second violation is not classified as the second scripting attack based on the second score for the second violation being below the individual scripting attack threshold.

In some aspects, classifying the second violation and the one or more third violations as the second scripting attack based on the second plurality of features and the third pluralities of features includes at least one of: determining a common scripting library associated with the second violation and the one or more third violations; determining a common OS where the second violation and the one or more third violations occurred; determining a common browser where the second violation and the one or more third violations occurred; determining a common browser version of the common browser where the second violation and the one or more third violations occurred; determining a common geographical region associated with the second violation and the one or more third violations; or determining the first web application and the one or more second web applications include a same web application type.

In some aspects, method 500 further includes, based on classifying the second violation and the one or more third violations as the second scripting attack, taking action to mitigate a potential scripting attack on a third web application. In some aspects, the third web application is at least one of: an application running a common scripting library as the first web application and the one or more second web applications; an application running on a same OS as the first web application and the one or more second web applications; an application running on a same browser as the first web application and the one or more second web applications; an application running on a same browser version as the first web application and the one or more second web applications; an application running in a same geographical region as the first web application and the one or more second web applications; or a same application as the first web application and the one or more second web applications.

In some aspects, the first security policy applied to the first web application is a CSP, and the first violation is a CSP violation.

In some aspects, the first scripting attack is a JavaScript attack.

Note that FIG. 5 is just one example of a method, and other methods including fewer, additional, or alternative steps are possible consistent with this disclosure.

Figure 6:
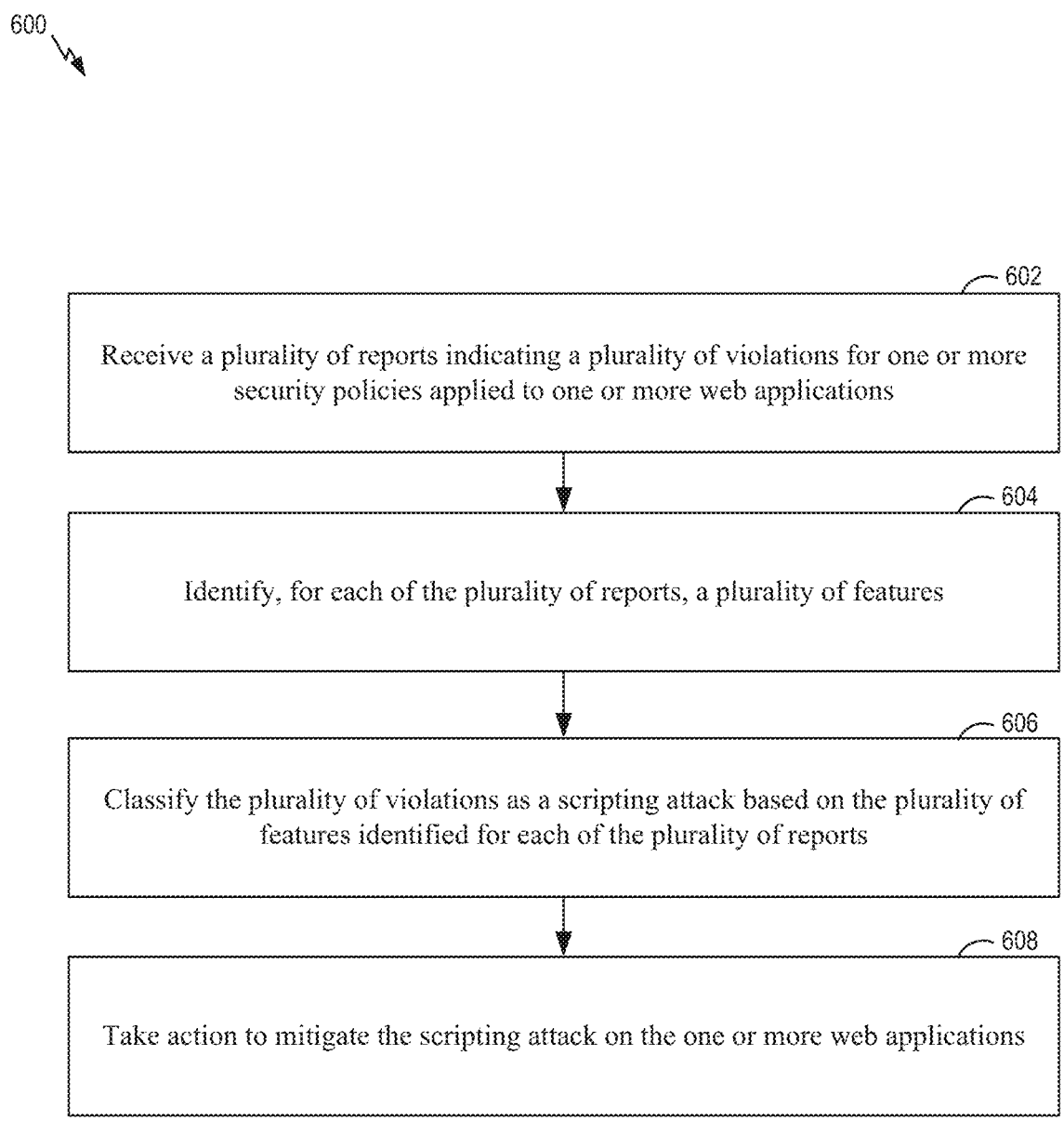
FIG. 6 illustrates an example method for large-scale scripting attack detection and mitigation.

FIG. 6 illustrates an example method 600 for large-scale scripting attack detection and mitigation. For example, method 600 may be performed to classify multiple security policy violations (e.g., multiple CSP violations for multiple CSPs applied to multiple web applications) as a scripting attack (e.g., a JavaScript attack), and take action to mitigate this attack at the multiple web applications, and in some cases, other web applications. Method 600 may be performed by one or more processor(s) of a computing device, such as processor(s) 702 of processing system 700 described below with respect FIG. 7.

Method 600 begins at step 602 with receiving a plurality of reports indicating a plurality of violations for one or more security policies applied to one or more web applications.

Method 600 then proceeds to step 604 with identifying, for each of the plurality of reports, a plurality of features.

Method 600 then proceeds to step 606 with classifying the plurality of violations as a scripting attack based on the plurality of features identified for each of the plurality of reports.

Method 600 then proceeds to step 608 with taking action to mitigate the scripting attack on the one or more web applications.

In some aspects, classifying the plurality of violations as the scripting attack based on the plurality of features identified for each of the plurality of reports includes: processing, with a model configured to generate a score indicative of a scripting attack, each of the plurality of features identified for each of the plurality of violations and thereby generate a score for each of the plurality of violations; generating a cumulative score based on the score generated for each of the plurality of violations; determining the cumulative score is above a widespread scripting attack threshold; and classifying the plurality of violations as the scripting attack based on the cumulative score being above the widespread scripting attack threshold.

In some aspects, the plurality of features identified for a violation of the plurality of violations include a plurality of features included in a report of the plurality of reports corresponding to the violation and include at least one of: a type of a browser where the violation occurred, a version of the browser, an internet protocol (IP) address of the browser, an operating system (OS) where the violation occurred, a uniform resource locator (URL) of a resource that was prevented from loading on the browser, a URL of a document in which the violation occurred, a scripting code sample analysis, a user-agent request header, or an identification of a security policy associated with the violation.

In some aspects, the plurality of features identified for the violation includes at least one of the IP address of the browser or the URL of the resource that was prevented from loading on the browser, and method 600 further includes: determining a domain associated with the IP address or the URL; and determining, for the domain, at least one of: a reputation score, a content delivery network (CDN) score, an Alexa 10k score, a malicious score, an alias score, a registration country, a registration date, or registration information, wherein the plurality of features further includes at least one of the reputation score, the CDN score, the Alexa 10k score, the malicious score, the alias score, the registration country, the registration date, or the registration information.

In some aspects, method 600 further includes determining a subdomain associated with the domain; and determining a reputation score for the subdomain, where the plurality of features further includes the reputation score for the subdomain.

In some aspects, the plurality of features identified for the violation includes the IP address of the browser and the URL of the resource that was prevented from loading on the browser, and method 600 further includes: determining a first domain associated with the URL; determining a second domain associated with the URL by performing a sequence of domain name system (DNS) and reverse DNS lookups; and determining whether the first domain and the second domain are equal.

In some aspects, the plurality of features identified for the violation includes at least one of the IP address of the browser or the URL of the resource that was prevented from loading on the browser, and method 600 further includes: determining the IP address of the browser; and determining, for the IP address, at least one of: a reputation score, or a malicious score, wherein the plurality of features further includes at least one of the reputation score or the malicious score for the IP address.

In some aspects, the plurality of features identified for the violation includes the URL of the resource that was prevented from loading on the browser, and method 600 further includes: performing a nameserver lookup using the URL to obtain nameserver records for a domain associated with the URL; and determining a reputation score for the nameserver records, wherein the plurality of features further includes the reputation score for the nameserver records.

In some aspects, the plurality of features identified for the violation includes the scripting code sample analysis, and method 600 further includes comparing the scripting code sample analysis with an original scripting code sample analysis.

In some aspects, method 600 further includes generating a loading sequence for each of the plurality of violations, wherein the plurality of features identified for each of the plurality of violations includes the loading sequence generated for the corresponding violation.

In some aspects, method 600 further includes identifying one or more scripts running when each of the plurality of violations occurred; and generating behavior of the one or more scripts identified for each of the plurality of violations, wherein the plurality of features identified for each of the plurality of violations includes the behavior of the one or more scripts generated for the corresponding violation.

In some aspects, classifying the plurality of violations as the scripting attack based on the plurality of features identified for each of the plurality of violations includes at least one of: determining a common scripting library associated with the plurality of violations; determining a common OS where each of the plurality of violations occurred; determining a common browser where each of the plurality of violations occurred; determining a common browser version of the common browser where each of the plurality of violations occurred; determining a common geographical region associated with the plurality of violations; or determining the one or more web applications include a same web application type.

In some aspects, taking action to mitigate the scripting attack on the one or more web applications includes: updating the one or more security policies applied to one or more web applications to prohibit execution of scripting code associated with the scripting attack; or updating the one or more security policies applied to one or more web applications to remove the scripting code.

In some aspects, method 600 further includes based on classifying the plurality of violations as the scripting attack, taking action to mitigate a potential scripting attack on another web application.

In some aspects, each of the other web applications are at least one of: an application running a common scripting library as the one or more web applications; an application running on a same OS as the one or more web applications; an application running on a same browser as the one or more web applications; an application running on a same browser version as one or more web applications; an application running in a same geographical region as the one or more web applications; or a same application as the one or more web applications.

In some aspects, the one or more security policies applied to one or more web applications are CSPs, and the plurality of violations are CSP violations.

In some aspects, the scripting attack is a JavaScript attack.

Note that FIG. 6 is just one example of a method, and other methods including fewer, additional, or alternative steps are possible consistent with this disclosure.

Example Processing System for Detecting and Mitigating Scripting Attacks

Figure 7:
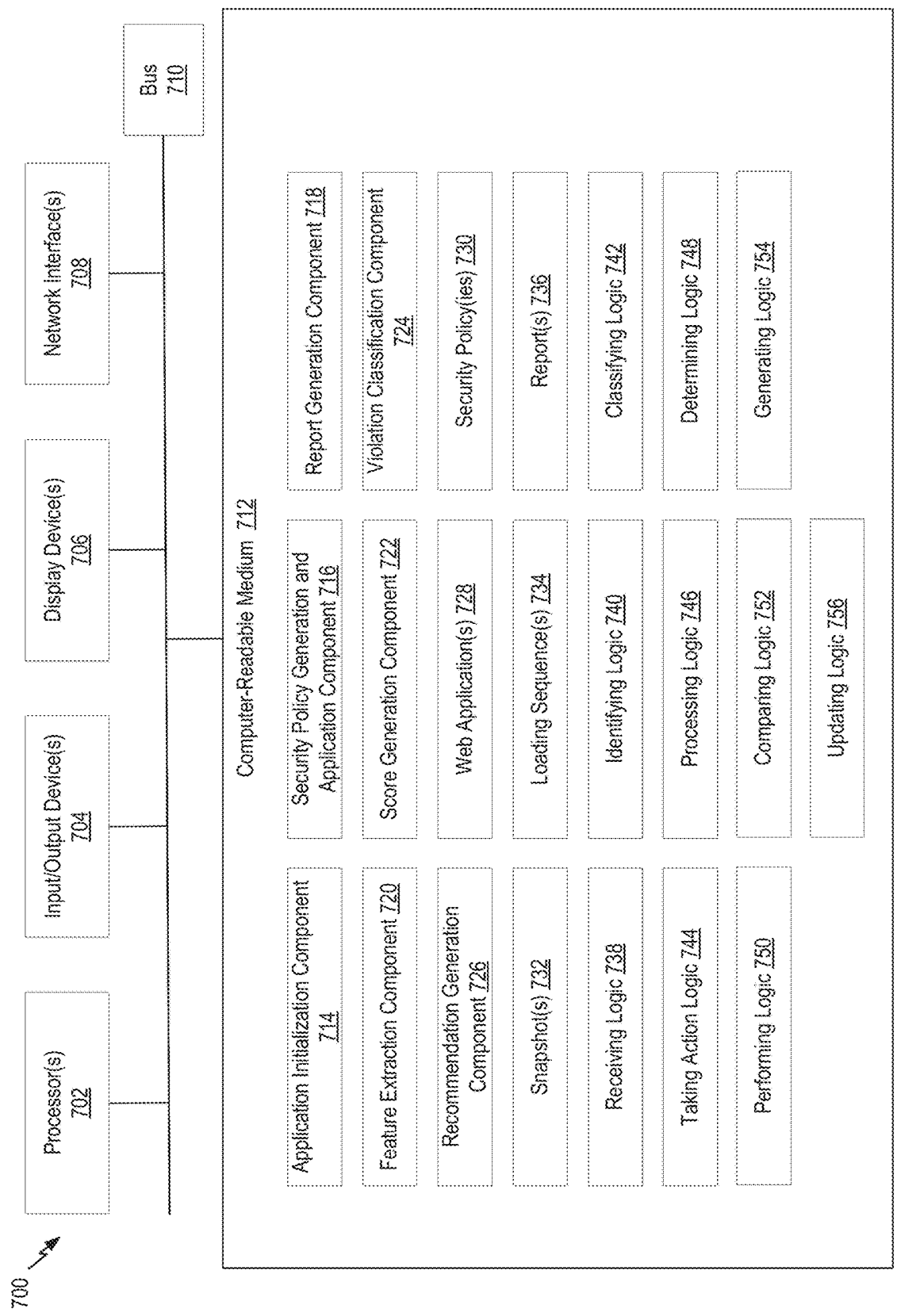
FIG. 7 illustrates an example processing system on which aspects of the present disclosure can be performed.

FIG. 7 depicts an example processing system 700 configured to perform various aspects described herein, including, for example, steps in process flow 200 as described above with respect to FIG. 2 and the examples described with respect to FIGS. 3A-3B, method 500 as described above with respect to FIG. 5, and method 600 as described above with respect to FIG. 6.

Processing system 700 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, and one or more network interfaces 708 through which processing system 700 is connected to one or more networks (e.g., a local network, an intranet, the Internet, or any other group of processing systems communicatively connected to each other), and computer-readable medium 712.

In the depicted example, the aforementioned components are coupled by a bus 710, which may generally be configured for data and/or power exchange amongst the components. Bus 710 may be representative of multiple buses, while only one is depicted for simplicity.

Processor(s) 702 are generally configured to retrieve and execute instructions stored in one or more memories, including local memories like the computer-readable medium 712, as well as remote memories and data stores. Similarly, processor(s) 702 are configured to retrieve and store application data residing in local memories like the computer-readable medium 712, as well as remote memories and data stores. More generally, bus 710 is configured to transmit programming instructions and application data among the processor(s) 702, display device(s) 706, network interface(s) 708, and computer-readable medium 712. In certain embodiments, processor(s) 702 are included to be representative of a one or more central processing units (CPUs), graphics processing unit (GPUs), tensor processing unit (TPUs), accelerators, and other processing devices.

Input/output device(s) 704 may include any device, mechanism, system, interactive display, and/or various other hardware components for communicating information between processing system 700 and a user of processing system 700. For example, input/output device(s) 704 may include input hardware, such as a keyboard, touch screen, button, microphone, and/or other device for receiving inputs from the user. Input/output device(s) 704 may further include display hardware, such as, for example, a monitor, a video card, and/or other another device for sending and/or presenting visual data to the user. In certain embodiments, input/output device(s) 704 is or includes a graphical user interface.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices.

Network interface(s) 708 provide processing system 700 with access to external networks and thereby to external processing systems. Network interface(s) 708 can generally be any device capable of transmitting and/or receiving data via a wired or wireless network connection. Accordingly, network interface(s) 708 can include a communication transceiver for sending and/or receiving any wired and/or wireless communication. For example, Network interface(s) 708 may include an antenna, a modem, a LAN port, a Wi-Fi card, a WiMAX card, cellular communications hardware, nearfield communication (NFC) hardware, satellite communication hardware, and/or any wired or wireless hardware for communicating with other networks and/or devices/systems. In certain embodiments, network interface(s) 708 includes hardware configured to operate in accordance with the Bluetooth® wireless communication protocol.

Computer-readable medium 712 may be a volatile memory, such as a random access memory (RAM), or a nonvolatile memory, such as nonvolatile random access memory, phase change random access memory, or the like. In this example, computer-readable medium 712 includes application initialization component 714, security policy generation and application component 716, report generation component 718, feature extraction component 720, score generation component 722, violation classification component 724, recommendation generation component 726, web application(s) 728, security policy(ies) 730, snapshot(s) 732, loading sequence(s) 734, report(s) 736, receiving logic 738, identifying logic 740, classifying logic 742, taking action logic 744, processing logic 746, determining logic 748, performing logic 750, comparing logic 752, generating logic 754, and/or updating logic 756.

In certain embodiments, application initialization component 714 is configured to locate and deliver requested web application(s) to a browser through an interface of the browser.

In certain embodiments, security policy generation and application component 716 is configured to define security policies (e.g., CSPs) that are to be applied to web applications executing in a browser to thereby enhance the security of such applications.

In certain embodiments, report generation component 718 is configured to generate a report (e.g., a CSP report) indicating a CSP violation for a CSP applied to a web application.

In certain embodiments, feature extraction component 720 is configured to identify one or more pluralities of features associated with one or more violations generated for one or more security policies applied to one or more web applications.

In certain embodiments, score generation component 722 is configured to generate a score for a violation using a plurality of features identified for the violation.

In certain embodiments, violation classification component 724 is configured to classify one or more violations reported for one or more security policies applied to one or more web applications as a JavaScript attack.

In certain embodiments, recommendation generation component 726 is configured to determine one or more recommended actions based on detecting, or failing to detect, a JavaScript attack using one or more violations reported for one or more security policies applied to one or more web applications.

In certain embodiments, web application(s) 728 comprise software or programs that are accessible using any web browser.

In certain embodiments, security policy(ies) 730 provide an added layer of security that makes it possible for developers to reduce, and in some cases eliminate, the vectors by which XSS can occur.

In certain embodiments, snapshot(s) 732 comprise point-in-time archives of live web pages.

In certain embodiments, loading sequence(s) 734 define the order in which code is executed and/or loaded for a web application.

In certain embodiments, report(s) 736 are documents that provide immediate feedback into the types of violations that are occurring in real-time across one or more web applications.

In certain embodiments, receiving logic 738 includes logic for receiving a first report indicating a first violation for a first security policy applied to a first web application. In certain embodiments, receiving logic 738 includes logic for a second report indicating a second violation for the first security policy applied to the first web application and one or more third reports indicating one or more third violations for one or more third security policies applied to one or more second web applications. In certain embodiments, receiving logic 738 includes logic for receiving a plurality of reports indicating a plurality of violations for one or more security policies applied to one or more web applications.

In certain embodiments, identifying logic 740 includes logic for identifying a first plurality of features associated with the first violation. In certain embodiments, identifying logic 740 includes logic for identifying one or more JavaScripts running when the first violation occurred. In certain embodiments, identifying logic 740 includes logic for identifying a second plurality of features associated with a second violation and third pluralities of features associated with one or more third violations. In certain embodiments, identifying logic 740 includes logic for identifying, for each of a plurality of reports, a plurality of features.

In certain embodiments, classifying logic 742 includes logic for classifying the first violation as a first JavaScript attack based on the first plurality of features. In certain embodiments, classifying logic 742 includes logic for classifying the first violation as the first JavaScript attack based on the first score for the first violation being above the individual attack threshold. In certain embodiments, classifying logic 742 includes logic for classifying a second violation and one or more third violations as a second JavaScript attack based on a second plurality of features and a third pluralities of features. In certain embodiments, classifying logic 742 includes logic for classifying a second violation and one or more third violations as a second JavaScript attack based on a cumulative score being above a widespread attack threshold. In certain embodiments, classifying logic 742 includes logic for classifying a plurality of violations as a JavaScript attack based on a plurality of features identified for each of a plurality of reports.

In certain embodiments, taking action logic 744 includes logic for taking action to mitigate the first JavaScript attack on the first web application. In certain embodiments, taking action logic 744 includes logic for taking action to mitigate a second JavaScript attack on a first web application and one or more second web applications. In certain embodiments, taking action logic 744 includes logic for taking action to mitigate a potential JavaScript attack on a third web application. In certain embodiments, taking action logic 744 includes logic for taking action to mitigate a JavaScript attack on one or more web applications.

In certain embodiments, processing logic 746 includes logic for processing, with a model configured to generate a score indicative of a JavaScript attack, the first plurality of features and thereby generate a first score for the first violation. In certain embodiments, processing logic 746 includes logic for processing, with a model configured to generate a score indicative of a JavaScript attack, the second plurality of features and thereby generate a second score for the second violation. In certain embodiments, processing logic 746 includes logic for processing, with the model, the third pluralities of features and thereby generate one or more third scores for the one or more third violations. In certain embodiments, processing logic 746 includes logic for processing, with a model configured to generate a score indicative of a JavaScript attack, only the second plurality of features and thereby generate a second score for the second violation.

In certain embodiments, determining logic 748 includes logic for determining the first score for the first violation is above an individual attack threshold. In certain embodiments, determining logic 748 includes logic for determining a domain associated with the IP address or the URL. In certain embodiments, determining logic 748 includes logic for determining, for the domain, at least one of: a reputation score, a CDN score, an Alexa 10k score, a malicious score, an alias score, a registration country, a registration date, or registration information. In certain embodiments, determining logic 748 includes logic for determining a subdomain associated with the domain. In certain embodiments, determining logic 748 includes logic for determining a reputation score for the subdomain, where the first plurality of features further comprises the reputation score for the subdomain. In certain embodiments, determining logic 748 includes logic for determining a first domain associated with a URL, determining a second domain associated with the URL by performing a sequence of DNS and rDNS lookups, and determining whether the first domain and the second domain are equal. In certain embodiments, determining logic 748 includes logic for determining an IP address of a browser. In certain embodiments, determining logic 748 includes logic for determining, for the IP address, at least one of: a reputation score, or a malicious score. In certain embodiments, determining logic 748 includes logic for determining a reputation score for nameserver records. In certain embodiments, determining logic 748 includes logic for determining the cumulative score is above a widespread attack threshold. In certain embodiments, determining logic 748 includes logic for determining a second violation is not classified as a second JavaScript attack based on only a second plurality of features. In certain embodiments, determining logic 748 includes logic for determining a second score for a second violation is below an individual attack threshold. In certain embodiments, determining logic 748 includes logic for determining a second violation is not classified as a second JavaScript attack based on the second score for the second violation being below an individual attack threshold. In certain embodiments, determining logic 748 includes logic for determining a common JavaScript library associated with the second violation and the one or more third violations. In certain embodiments, determining logic 748 includes logic for determining a common OS where the second violation and the one or more third violations occurred. In certain embodiments, determining logic 748 includes logic for determining a common browser where the second violation and the one or more third violations occurred. In certain embodiments, determining logic 748 includes logic for determining a common browser version of the common browser where the second violation and the one or more third violations occurred. In certain embodiments, determining logic 748 includes logic for determining a common geographical region associated with the second violation and the one or more third violations. In certain embodiments, determining logic 748 includes logic for determining the first web application and the one or more second web applications comprise a same web application type.

In certain embodiments, performing logic 750 includes logic for performing a nameserver lookup using the URL to obtain nameserver records for a domain associated with the URL.

In certain embodiments, comparing logic 752 includes logic for comparing a JavaScript sample analysis with an original JavaScript sample analysis.

In certain embodiments, generating logic 754 includes logic for generating a loading sequence based on, at least, the first violation, wherein the first plurality of features comprises the loading sequence. In certain embodiments, generating logic 754 includes logic for generating behavior of the one or more JavaScripts based on the first violation. In certain embodiments, generating logic 754 includes logic for generating a cumulative score based on the second score and one or more third scores.

In certain embodiments, updating logic 756 includes logic for updating the first security policy applied to the first web application to prohibit execution of JavaScript associated with the first JavaScript attack.

Note that FIG. 7 is just one example of a processing system consistent with aspects described herein, and other processing systems having additional, alternative, or fewer components are possible consistent with this disclosure.

Example Clauses

Implementation details of various aspects of the present disclosure are described in the following numbered clauses.

Clause 1: A method for scripting attack detection and mitigation, comprising: receiving a first report indicating a first violation for a first security policy applied to a first web application; identifying a first plurality of features associated with the first violation; classifying the first violation as a first scripting attack based on the first plurality of features; and taking action to mitigate the first scripting attack on the first web application.

Clause 2: The method of Clause 1, wherein classifying the first violation as the first scripting attack based on the first plurality of features comprises: processing, with a model configured to generate a score indicative of a scripting attack, the first plurality of features and thereby generate a first score for the first violation; determining the first score for the first violation is above an individual scripting attack threshold; and classifying the first violation as the first scripting attack based on the first score for the first violation being above the individual scripting attack threshold.

Clause 3: The method of any one of Clauses 1-2, wherein the first plurality of features associated with the first violation comprise a plurality of features included in the first report and comprising at least one of: a type of a browser where the first violation occurred, a version of the browser, an internet protocol (IP) address of the browser, an operating system (OS) where the first violation occurred, a uniform resource locator (URL) of a resource that was prevented from loading on the browser, a URL of a document in which the first violation occurred, a scripting code sample analysis, a user-agent request header, or an identification of the first security policy.

Clause 4: The method of Clause 3, wherein: the first plurality of features associated with the first violation comprises at least one of the IP address of the browser or the URL of the resource that was prevented from loading on the browser, and the method further comprises: determining a domain associated with the IP address or the URL; and determining, for the domain, at least one of: a reputation score, a content delivery network (CDN) score, an Alexa 10k score, a malicious score, an alias score, a registration country, a registration date, or registration information, wherein the first plurality of features further comprises at least one of the reputation score, the CDN score, the Alexa 10k score, the malicious score, the alias score, the registration country, the registration date, or the registration information.

Clause 5: The method of Clause 4, further comprising: determining a subdomain associated with the domain; and determining a reputation score for the subdomain, where the first plurality of features further comprises the reputation score for the subdomain.

Clause 6: The method of any one of Clauses 3-5, wherein: the first plurality of features associated with the first violation comprises the IP address of the browser and the URL of the resource that was prevented from loading on the browser, and the method further comprises: determining a first domain associated with the URL; determining a second domain associated with the URL by performing a sequence of domain name system (DNS) and reverse DNS lookups; and determining whether the first domain and the second domain are equal.

Clause 7: The method of any one of Clauses 3-6, wherein: the first plurality of features associated with the first violation comprises at least one of the IP address of the browser or the URL of the resource that was prevented from loading on the browser, and the method further comprises: determining the IP address of the browser; and determining, for the IP address, at least one of: a reputation score, or a malicious score, wherein the first plurality of features further comprises at least one of the reputation score or the malicious score for the IP address.

Clause 8: The method of any one of Clauses 3-7, wherein: the first plurality of features associated with the first violation comprises the URL of the resource that was prevented from loading on the browser, and the method further comprises: performing a nameserver lookup using the URL to obtain nameserver records for a domain associated with the URL; and determining a reputation score for the nameserver records, wherein the first plurality of features further comprises the reputation score for the nameserver records.

Clause 9: The method of any one of Clauses 3-8, wherein: the first plurality of features associated with the first violation comprises the scripting code sample analysis, and the method further comprises comparing the scripting code sample analysis with an original scripting code sample analysis.

Clause 10: The method of any one of Clauses 1-9, further comprising generating a loading sequence based on, at least, the first violation, wherein the first plurality of features comprises the loading sequence.

Clause 11: The method of any one of Clauses 1-10, further comprising: identifying one or more scripts running when the first violation occurred; and generating behavior of the one or more scripts based on the first violation, wherein the first plurality of features comprises the behavior of the one or more scripts.

Clause 12: The method of any one of Clauses 1-11, wherein taking action to mitigate the first scripting attack on the first web application comprises: updating the first security policy applied to the first web application to prohibit execution of scripting code associated with the first scripting attack; or updating the first security policy applied to the first web application to remove the scripting code.

Clause 13: The method of any one of Clauses 1-12, further comprising: receiving a second report indicating a second violation for the first security policy applied to the first web application and one or more third reports indicating one or more third violations for one or more third security policies applied to one or more second web applications; identifying a second plurality of features associated with the second violation and third pluralities of features associated with the one or more third violations; classifying the second violation and the one or more third violations as a second scripting attack based on the second plurality of features and the third pluralities of features; and based on classifying the second violation and the one or more third violations as the second scripting attack, taking action to mitigate the second scripting attack on the first web application and the one or more second web applications.

Clause 14: The method of Clause 13, wherein classifying the second violation and the one or more third violations as the second scripting attack based on the second plurality of features and the third pluralities of features comprises: processing, with a model configured to generate a score indicative of a scripting attack, the second plurality of features and thereby generate a second score for the second violation; processing, with the model, the third pluralities of features and thereby generate one or more third scores for the one or more third violations; generating a cumulative score based on the second score and one or more third scores; determining the cumulative score is above a widespread scripting attack threshold; and classifying the second violation and the one or more third violations as the second scripting attack based on the cumulative score being above the widespread scripting attack threshold.

Clause 15: The method of any one of Clauses 13-14, further comprising: determining the second violation is not classified as the second scripting attack based on only the second plurality of features, wherein the classifying the second violation and the one or more third violations as the second scripting attack is performed based on the determining the second violation is not classified as the second scripting attack based on only the second plurality of features.

Clause 16: The method of Clause 15, wherein determining the second violation is not classified as the second scripting attack based on only the second plurality of features comprises: processing, with a model configured to generate a score indicative of a scripting attack, only the second plurality of features and thereby generate a second score for the second violation; determining the second score for the second violation is below an individual scripting attack threshold; and determining the second violation is not classified as the second scripting attack based on the second score for the second violation being below the individual scripting attack threshold.

Clause 17: The method of any one of Clauses 13-16, wherein classifying the second violation and the one or more third violations as the second scripting attack based on the second plurality of features and the third pluralities of features comprises at least one of: determining a common scripting library associated with the second violation and the one or more third violations; determining a common OS where the second violation and the one or more third violations occurred; determining a common browser where the second violation and the one or more third violations occurred; determining a common browser version of the common browser where the second violation and the one or more third violations occurred; determining a common geographical region associated with the second violation and the one or more third violations; or determining the first web application and the one or more second web applications comprise a same web application type.

Clause 18: The method of any one of Clauses 13-17, further comprising, based on classifying the second violation and the one or more third violations as the second scripting attack, taking action to mitigate a potential scripting attack on a third web application.

Clause 19: The method of Clause 18, wherein the third web application comprises at least one of: an application running a common scripting library as the first web application and the one or more second web applications; an application running on a same OS as the first web application and the one or more second web applications; an application running on a same browser as the first web application and the one or more second web applications; an application running on a same browser version as the first web application and the one or more second web applications; an application running in a same geographical region as the first web application and the one or more second web applications; or a same application as the first web application and the one or more second web applications.

Clause 20: The method of any one of Clauses 1-19, wherein: the first security policy applied to the first web application comprises a content security policy (CSP), and the first violation comprises a CSP violation.

Clause 21: The method of any one of Clauses 1-20, wherein the first scripting attack comprises a JavaScript attack.

Clause 22: A method for scripting attack detection and mitigation, comprising: receiving a plurality of reports indicating a plurality of violations for one or more security policies applied to one or more web applications; identifying, for each of the plurality of violations, a plurality of features; classifying the plurality of violations as a scripting attack based on the plurality of features identified for each of the plurality of violations; and taking action to mitigate the scripting attack on the one or more web applications.

Clause 23: The method of Clause 22, wherein classifying the plurality of violations as the scripting attack based on the plurality of features identified for each of the plurality of reports comprises: processing, with a model configured to generate a score indicative of a scripting attack, each of the plurality of features identified for each of the plurality of violations and thereby generate a score for each of the plurality of violations; generating a cumulative score based on the score generated for each of the plurality of violations; determining the cumulative score is above a widespread scripting attack threshold; and classifying the plurality of violations as the scripting attack based on the cumulative score being above the widespread scripting attack threshold.

Clause 24: The method of any one of Clauses 22-23, wherein the plurality of features identified for a violation of the plurality of violations comprise a plurality of features included in a report of the plurality of reports corresponding to the violation and comprise at least one of: a type of a browser where the violation occurred, a version of the browser, an internet protocol (IP) address of the browser, an operating system (OS) where the violation occurred, a uniform resource locator (URL) of a resource that was prevented from loading on the browser, a URL of a document in which the violation occurred, a scripting code sample analysis, a user-agent request header, or an identification of a security policy associated with the violation.

Clause 25: The method of Clause 24, wherein: the plurality of features identified for the violation comprises at least one of the IP address of the browser or the URL of the resource that was prevented from loading on the browser, and the method further comprises: determining a domain associated with the IP address or the URL; and determining, for the domain, at least one of: a reputation score, a content delivery network (CDN) score, an Alexa 10k score, a malicious score, an alias score, a registration country, a registration date, or registration information, wherein the plurality of features further comprises at least one of the reputation score, the CDN score, the Alexa 10k score, the malicious score, the alias score, the registration country, the registration date, or the registration information.

Clause 26: The method of Clause 25, further comprising: determining a subdomain associated with the domain; and determining a reputation score for the subdomain, where the plurality of features further comprises the reputation score for the subdomain.

Clause 27: The method of any one of Clauses 24-26, wherein: the plurality of features identified for the violation comprises the IP address of the browser and the URL of the resource that was prevented from loading on the browser, and the method further comprises: determining a first domain associated with the URL; determining a second domain associated with the URL by performing a sequence of domain name system (DNS) and reverse DNS lookups; and determining whether the first domain and the second domain are equal.

Clause 28: The method of any one of Clauses 24-27, wherein: the plurality of features identified for the violation comprises at least one of the IP address of the browser or the URL of the resource that was prevented from loading on the browser, and the method further comprises: determining the IP address of the browser; and determining, for the IP address, at least one of: a reputation score, or a malicious score, wherein the plurality of features further comprises at least one of the reputation score or the malicious score for the IP address.

Clause 29: The method of any one of Clauses 24-28, wherein: the plurality of features identified for the violation comprises the URL of the resource that was prevented from loading on the browser, and the method further comprises: performing a nameserver lookup using the URL to obtain nameserver records for a domain associated with the URL; and determining a reputation score for the nameserver records, wherein the plurality of features further comprises the reputation score for the nameserver records.

Clause 30: The method of any one of Clauses 24-29, wherein: the plurality of features identified for the violation comprises the scripting code sample analysis, and the method further comprises comparing the scripting code sample analysis with an original scripting code sample analysis.

Clause 31: The method of any one of Clauses 22-30, further comprising generating a loading sequence for each of the plurality of violations, wherein the plurality of features identified for each of the plurality of violations comprises the loading sequence generated for the corresponding violation.

Clause 32: The method of any one of Clauses 22-31, further comprising: identifying one or more scripts running when each of the plurality of violations occurred; and generating behavior of the one or more scripts identified for each of the plurality of violations, wherein the plurality of features identified for each of the plurality of violations comprises the behavior of the one or more scripts generated for the corresponding violation.

Clause 33: The method of any one of Clauses 22-32, wherein classifying the plurality of violations as the scripting attack based on the plurality of features identified for each of the plurality of violations comprises at least one of: determining a common scripting library associated with the plurality of violations; determining a common OS where each of the plurality of violations occurred; determining a common browser where each of the plurality of violations occurred; determining a common browser version of the common browser where each of the plurality of violations occurred; determining a common geographical region associated with the plurality of violations; or determining the one or more web applications comprise a same web application type.

Clause 34: The method of any one of Clauses 22-33, wherein taking action to mitigate the scripting attack on the one or more web applications comprises: updating the one or more security policies applied to one or more web applications to prohibit execution of scripting code associated with the scripting attack; or updating the one or more security policies applied to one or more web applications to remove the scripting code.

Clause 35: The method of any one of Clauses 22-34, further comprising, based on classifying the plurality of violations as the scripting attack, taking action to mitigate a potential scripting attack on another web application.

Clause 36: The method of Clause 35, wherein each of the other web applications comprises at least one of: an application running a common scripting library as the one or more web applications; an application running on a same OS as the one or more web applications; an application running on a same browser as the one or more web applications; an application running on a same browser version as one or more web applications; an application running in a same geographical region as the one or more web applications; or a same application as the one or more web applications.

Clause 37: The method of any one of Clauses 22-36, wherein: the one or more security policies applied to one or more web applications comprise content security policies (CSPs), and the plurality of violations comprise CSP violations.

Clause 38: The method of any one of Clauses 22-37, wherein the scripting attack comprises a JavaScript attack.

Clause 39: A processing system, comprising: a memory comprising computer-executable instructions; and a processor configured to execute the computer-executable instructions and cause the processing system to perform a method in accordance with any one of Clauses 1-38.

Clause 40: A processing system, comprising means for performing a method in accordance with any one of Clauses 1-38.

Clause 42: A non-transitory computer-readable medium storing program code for causing a processing system to perform the steps of any one of Clauses 1-38.

Clause 43: A computer program product embodied on a computer-readable storage medium comprising code for performing a method in accordance with any one of Clauses 1-38.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various steps of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are steps illustrated in figures, those steps may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for scripting attack detection and mitigation, comprising:
   receiving a first report indicating a first violation for a first security policy applied to a first web application;
   identifying a first plurality of features associated with the first violation, the first plurality of features comprising a uniform resource locator (URL) of a resource that was prevented from loading on a browser where the first violation occurred and is included in the first report;
   determining a first domain associated with the URL;
   determining a second domain associated with the URL by performing a sequence of domain name system (DNS) and reverse DNS lookups;
   determining whether the first domain and the second domain are equal, wherein the first plurality of features further comprises the determination whether the first domain and the second domain are equal;
   classifying the first violation as a first scripting attack based on the first plurality of features; and
   taking action to mitigate the first scripting attack on the first web application.

2. The method of claim 1, wherein classifying the first violation as the first scripting attack based on the first plurality of features comprises:
   processing, with a model configured to generate a score indicative of a scripting attack, the first plurality of features and thereby generate a first score for the first violation;
   determining the first score for the first violation is above an individual scripting attack threshold; and
   classifying the first violation as the first scripting attack based on the first score for the first violation being above the individual scripting attack threshold.

3. The method of claim 1, wherein the first plurality of features associated with the first violation and included in the first report further comprise at least one of:
   a type of the browser,
   a version of the browser,
   an internet protocol (IP) address of the browser,
   an operating system (OS) where the first violation occurred,
   a URL of a document in which the first violation occurred,
   a scripting code sample analysis,
   a user-agent request header, or
   an identification of the first security policy.

4. The method of claim 1, further comprising:
   determining, for the first domain, at least one of:
   a reputation score,
   a content delivery network (CDN) score,
   an Alexa 10k score,
   a malicious score,
   an alias score,
   a registration country,
   a registration date, or
   registration information, wherein the first plurality of features further comprises at least one of the reputation score, the CDN score, the Alexa 10k score, the malicious score, the alias score, the registration country, the registration date, or the registration information.

5. The method of claim 4, further comprising:
   determining a subdomain associated with the first domain; and
   determining a reputation score for the subdomain, where the first plurality of features further comprises the reputation score for the subdomain.

6. The method of claim 1, further comprising:
   determining an internet protocol (IP) address of the browser, and
   determining, for the IP address, at least one of:
   a reputation score, or
   a malicious score, wherein the first plurality of features further comprises at least one of the reputation score or the malicious score for the IP address.

7. The method of claim 1, further comprising:
   performing a nameserver lookup using the URL to obtain nameserver records for a domain associated with the URL; and
   determining a reputation score for the nameserver records, wherein the first plurality of features further comprises the reputation score for the nameserver records.

8. The method of claim 1, further comprising generating a loading sequence based on, at least, the first violation, wherein the first plurality of features further comprise the loading sequence.

9. The method of claim 1, further comprising:
   identifying one or more scripts running when the first violation occurred; and
   generating behavior of the one or more scripts based on the first violation, wherein the first plurality of features further comprise the behavior of the one or more scripts.

10. The method of claim 1, wherein taking action to mitigate the first scripting attack on the first web application comprises:
    updating the first security policy applied to the first web application to prohibit execution of scripting code associated with the first scripting attack; or
    updating the first security policy applied to the first web application to remove the scripting code.

11. The method of claim 1, further comprising:
    receiving a second report indicating a second violation for the first security policy applied to the first web application and one or more third reports indicating one or more third violations for one or more third security policies applied to one or more second web applications;
    identifying a second plurality of features associated with the second violation and third pluralities of features associated with the one or more third violations;
    classifying the second violation and the one or more third violations as a second scripting attack based on the second plurality of features and the third pluralities of features; and
    based on classifying the second violation and the one or more third violations as the second scripting attack, taking action to mitigate the second scripting attack on the first web application and the one or more second web applications.

12. The method of claim 11, wherein classifying the second violation and the one or more third violations as the second scripting attack based on the second plurality of features and the third pluralities of features comprises:

processing, with a model configured to generate a score indicative of a scripting attack, the second plurality of features and thereby generate a second score for the second violation;

processing, with the model, the third pluralities of features and thereby generate one or more third scores for the one or more third violations;

generating a cumulative score based on the second score and one or more third scores;

determining the cumulative score is above a widespread scripting attack threshold; and classifying the second violation and the one or more third violations as the second scripting attack based on the cumulative score being above the widespread scripting attack threshold.

13. The method of claim 11, further comprising:

determining the second violation is not classified as the second scripting attack based on only the second plurality of features, wherein the classifying the second violation and the one or more third violations as the second scripting attack is performed based on the determining the second violation is not classified as the second scripting attack based on only the second plurality of features.

14. The method of claim 13, wherein determining the second violation is not classified as the second scripting attack based on only the second plurality of features comprises:

processing, with a model configured to generate a score indicative of a scripting attack, only the second plurality of features and thereby generate a second score for the second violation;

determining the second score for the second violation is below an individual scripting attack threshold; and determining the second violation is not classified as the second scripting attack based on the second score for the second violation being below the individual scripting attack threshold.

15. The method of claim 11, wherein classifying the second violation and the one or more third violations as the second scripting attack based on the second plurality of features and the third pluralities of features comprises at least one of:

determining a common scripting library associated with the second violation and the one or more third violations;

determining a common OS where the second violation and the one or more third violations occurred;

determining a common browser where the second violation and the one or more third violations occurred;

determining a common browser version of the common browser where the second violation and the one or more third violations occurred;

determining a common geographical region associated with the second violation and the one or more third violations; or determining the first web application and the one or more second web applications comprise a same web application type.

16. The method of claim 11, further comprising, based on classifying the second violation and the one or more third violations as the second scripting attack, taking action to mitigate a potential scripting attack on a third web application.

17. The method of claim 16, wherein the third web application comprises at least one of:

an application running a common scripting library as the first web application and the one or more second web applications;

an application running on a same OS as the first web application and the one or more second web applications;

an application running on a same browser as the first web application and the one or more second web applications;

an application running on a same browser version as the first web application and the one or more second web applications;

an application running in a same geographical region as the first web application and the one or more second web applications; or a same application as the first web application and the one or more second web applications.

18. A method for scripting attack detection and mitigation, comprising:

receiving a first report indicating a first violation for a first security policy applied to a first web application;

identifying a first plurality of features associated with the first violation, the first plurality of features comprising a uniform resource locator (URL) of a resource that was prevented from loading on a browser where the first violation occurred and is included in the first report;

performing a nameserver lookup using the URL to obtain nameserver records for a domain associated with the URL;

determining a reputation score for the nameserver records, wherein the first plurality of features further comprises the reputation score for the nameserver records;

classifying the first violation as a first scripting attack based on the first plurality of features; and taking action to mitigate the first scripting attack on the first web application.

19. The method of claim 18, wherein classifying the first violation as the first scripting attack based on the first plurality of features comprises:

processing, with a model configured to generate a score indicative of a scripting attack, the first plurality of features and thereby generate a first score for the first violation;

determining the first score for the first violation is above an individual scripting attack threshold; and classifying the first violation as the first scripting attack based on the first score for the first violation being above the individual scripting attack threshold.

20. A method for scripting attack detection and mitigation, comprising:

receiving a first report indicating a first violation for a first security policy applied to a first web application;

generating a loading sequence based on, at least, the first violation;

identifying a first plurality of features associated with the first violation comprising at least the loading sequence;

classifying the first violation as a first scripting attack based on the first plurality of features; and taking action to mitigate the first scripting attack on the first web application.

* * * * *